(12) United States Patent
Kusama

(10) Patent No.: US 10,054,900 B2
(45) Date of Patent: Aug. 21, 2018

(54) DEVELOPER CARTRIDGE PROVIDED WITH GEAR HAVING PROTRUSIONS FOR DETECTION

(71) Applicant: Brother Kogyo Kabushiki Kaisha, Nagoya-shi, Aichi-ken (JP)

(72) Inventor: Takuro Kusama, Kitanagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/428,228

(22) Filed: Feb. 9, 2017

(65) Prior Publication Data

US 2017/0248904 A1    Aug. 31, 2017

(30) Foreign Application Priority Data

Feb. 26, 2016    (JP) .................... 2016-035464

(51) Int. Cl.
| | | |
|---|---|---|
| *G03G 15/04* | (2006.01) | |
| *G03G 21/16* | (2006.01) | |
| *F16H 37/12* | (2006.01) | |
| *G03G 21/18* | (2006.01) | |

(52) U.S. Cl.
CPC ....... *G03G 21/1647* (2013.01); *F16H 37/122* (2013.01); *G03G 21/1676* (2013.01); *G03G 21/1896* (2013.01)

(58) Field of Classification Search
CPC .............. F16H 37/122; G03G 21/1647; G03G 21/1676; G03G 21/1896; G03G 15/0865
See application file for complete search history.

(56) References Cited

U.S. PATENT DOCUMENTS

| 7,512,347 | B2 | 3/2009 | Suzuki et al. | |
|---|---|---|---|---|
| 7,970,293 | B2 * | 6/2011 | Ishikawa | G03G 15/0896 399/119 |
| 2006/0193646 | A1 | 8/2006 | Suzuki et al. | |
| 2011/0236062 | A1 | 9/2011 | Takagi | |
| 2011/0243578 | A1 * | 10/2011 | Ukai | G03G 21/1896 399/12 |
| 2013/0051814 | A1 * | 2/2013 | Itabashi | G03G 21/1857 399/12 |
| 2014/0037334 | A1 | 2/2014 | Takagi | |

(Continued)

FOREIGN PATENT DOCUMENTS

| JP | 4348632 B2 | 10/2009 |
|---|---|---|
| JP | 2011-203362 A | 10/2011 |

*Primary Examiner* — Francis C Gray
(74) *Attorney, Agent, or Firm* — Banner & Witcoff, Ltd.

(57) ABSTRACT

A developer cartridge includes a first gear rotatable about a first axis extending in an axial direction, and a second gear rotatable in a rotation direction about a second axis extending in the axial direction. The second gear includes: an engagement portion engageable with gear teeth of the first gear; a first protrusion and a second protrusion protruding in the axial direction. The first and second protrusions extend to be spaced apart from each other in the rotation direction. The first protrusion has first end and a second end defining a first angle therebetween about the second axis. The second protrusion has a third end and a fourth end farther away from the first protrusion than the third end is in the rotation direction. The second end and the third end define a second angle therebetween about the second axis. The first angle is smaller than the second angle.

21 Claims, 25 Drawing Sheets

(56) References Cited

U.S. PATENT DOCUMENTS

2016/0131995 A1    5/2016  Takagi
2017/0108820 A1*   4/2017  Taguchi ............. G03G 21/1647
2017/0108821 A1*   4/2017  Taguchi ............. G03G 15/0865
2017/0123346 A1*   5/2017  Shimizu ............. G03G 15/0865

* cited by examiner

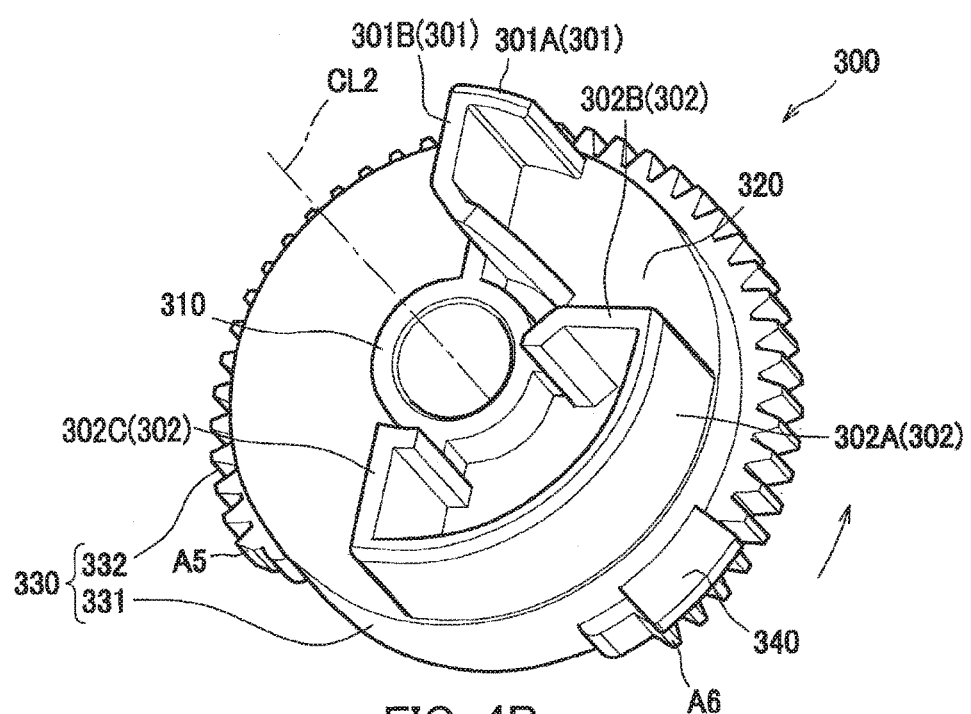
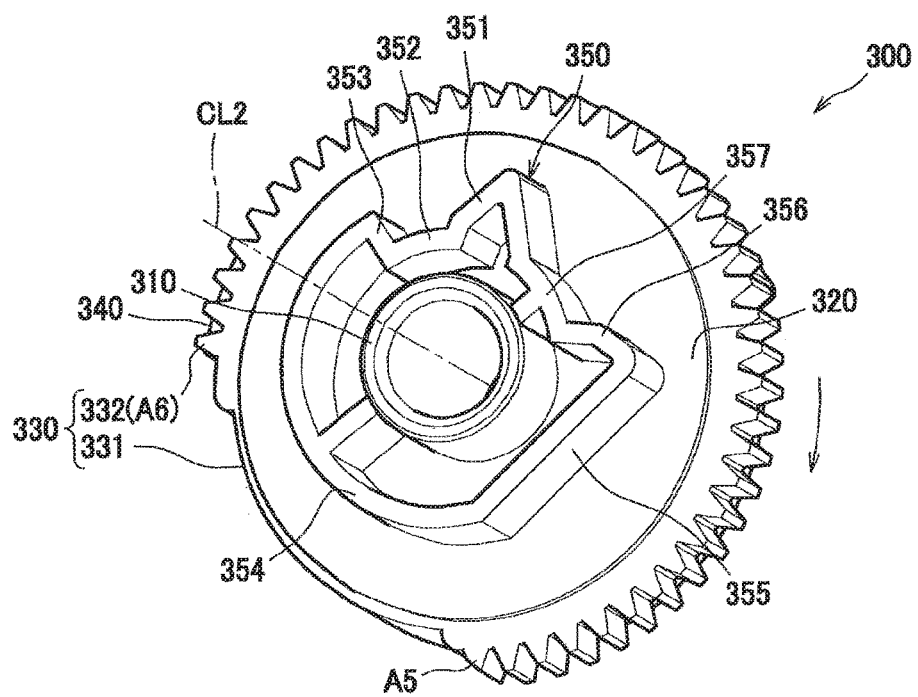

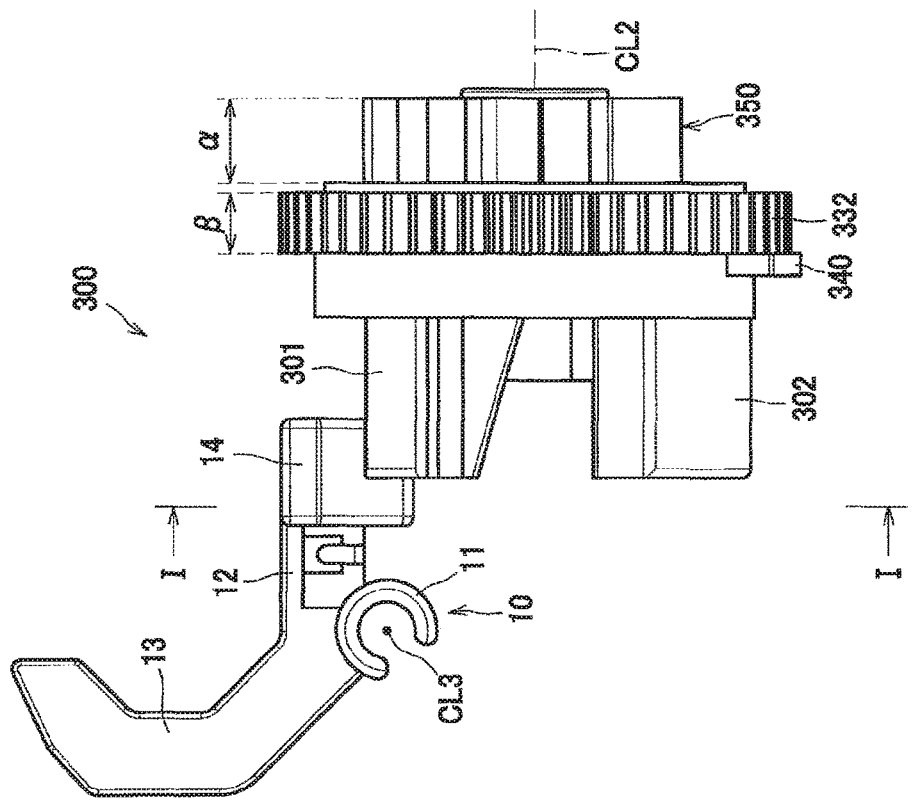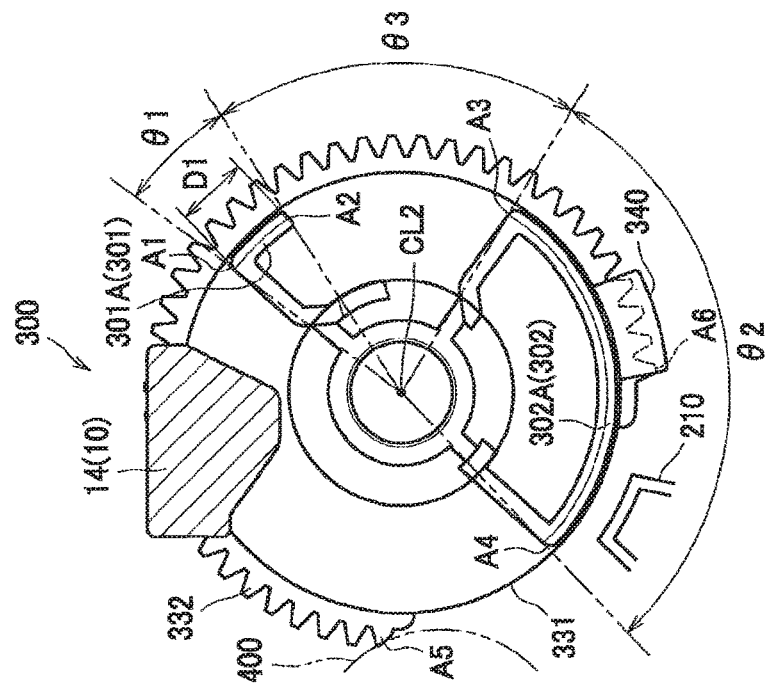

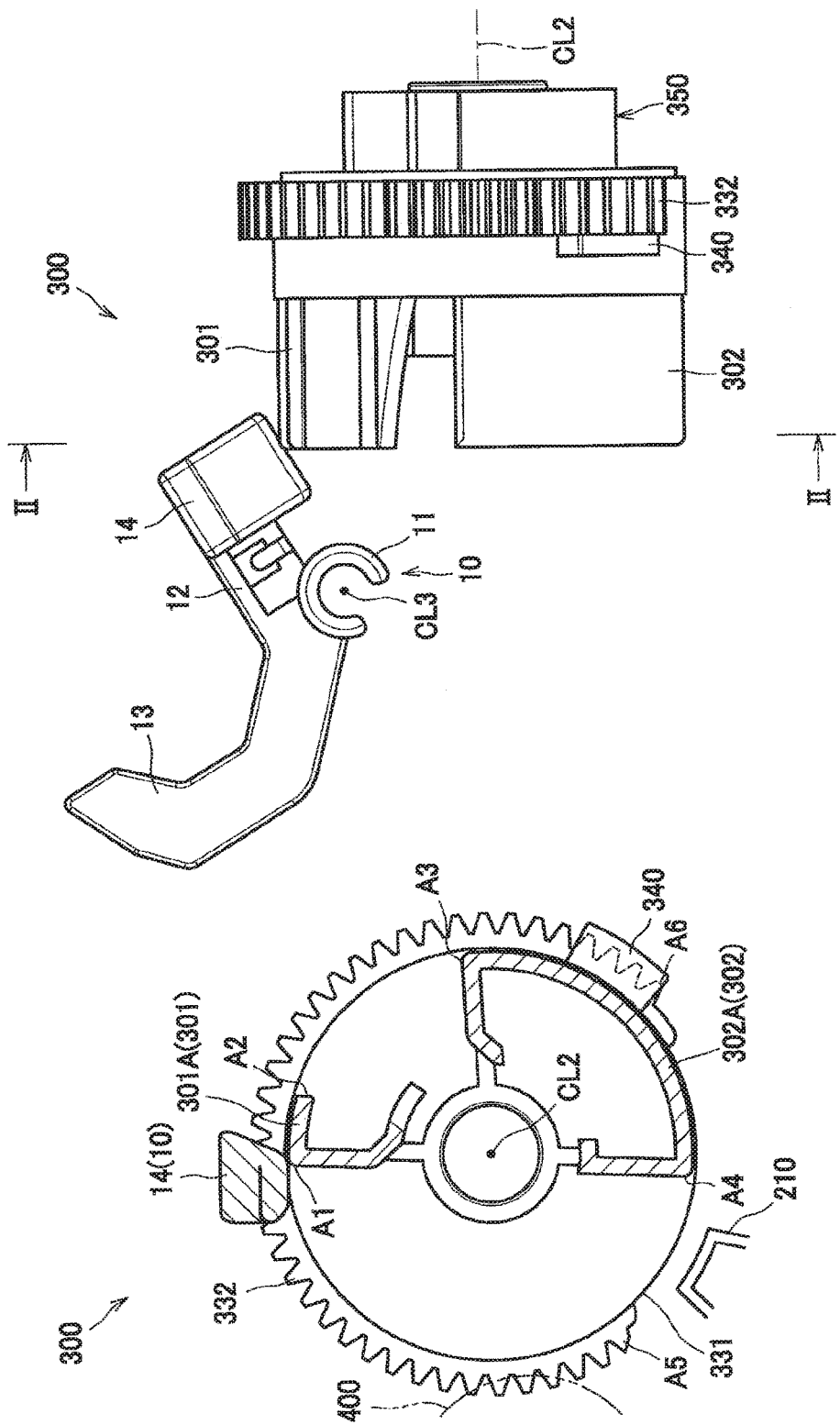

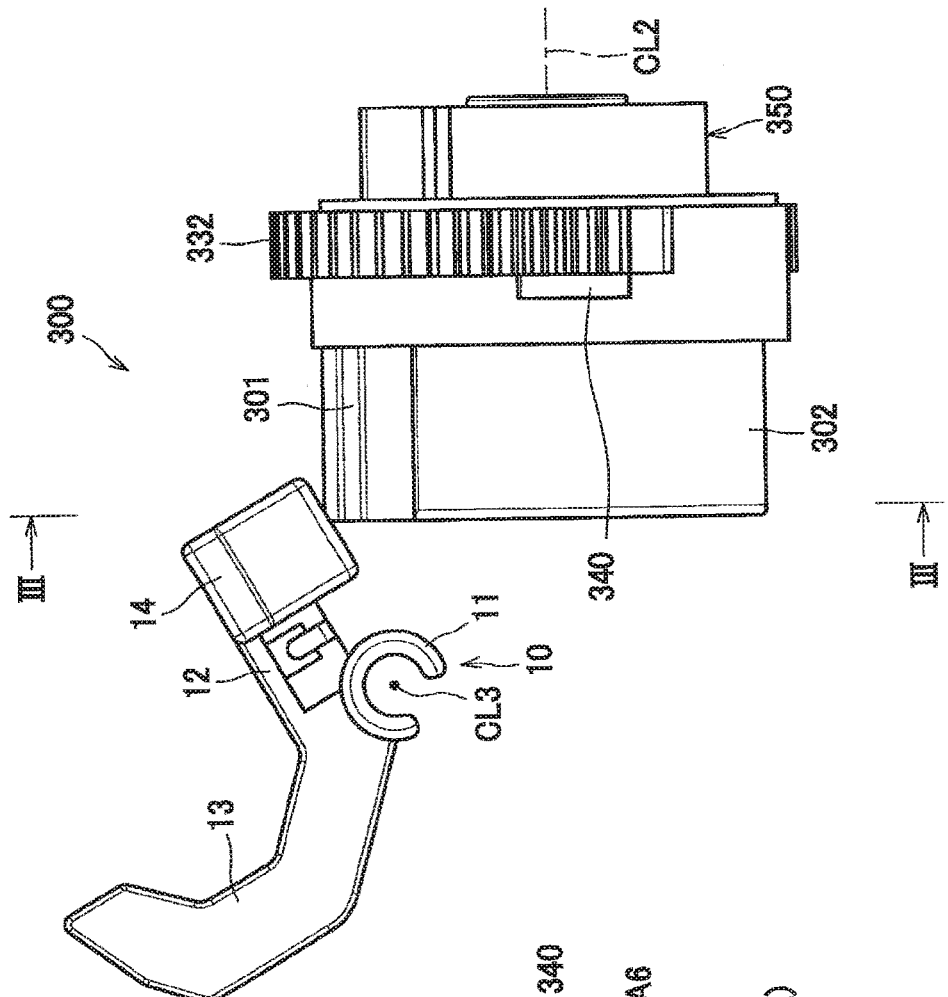
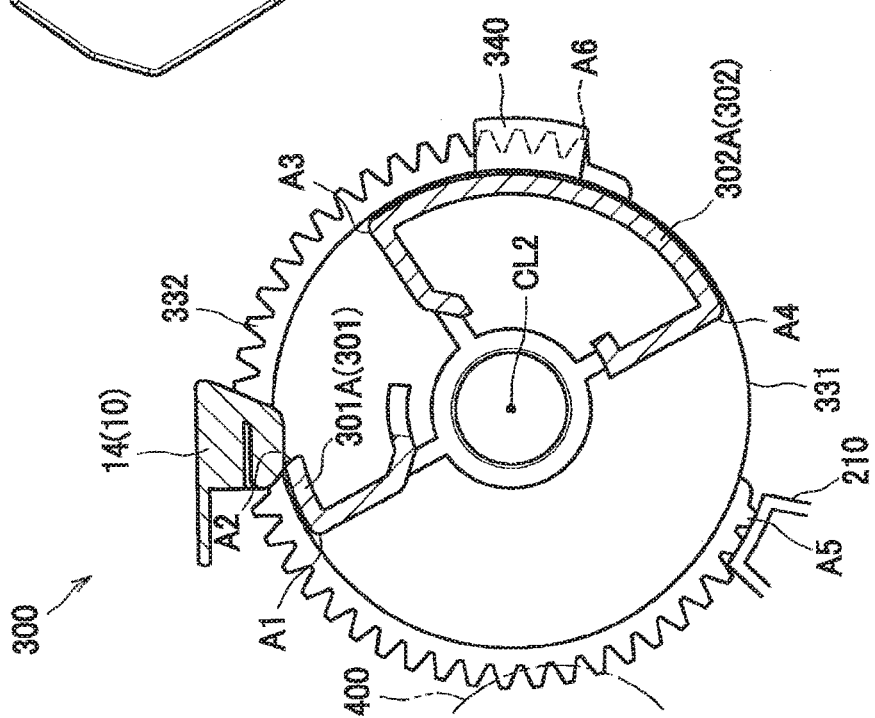

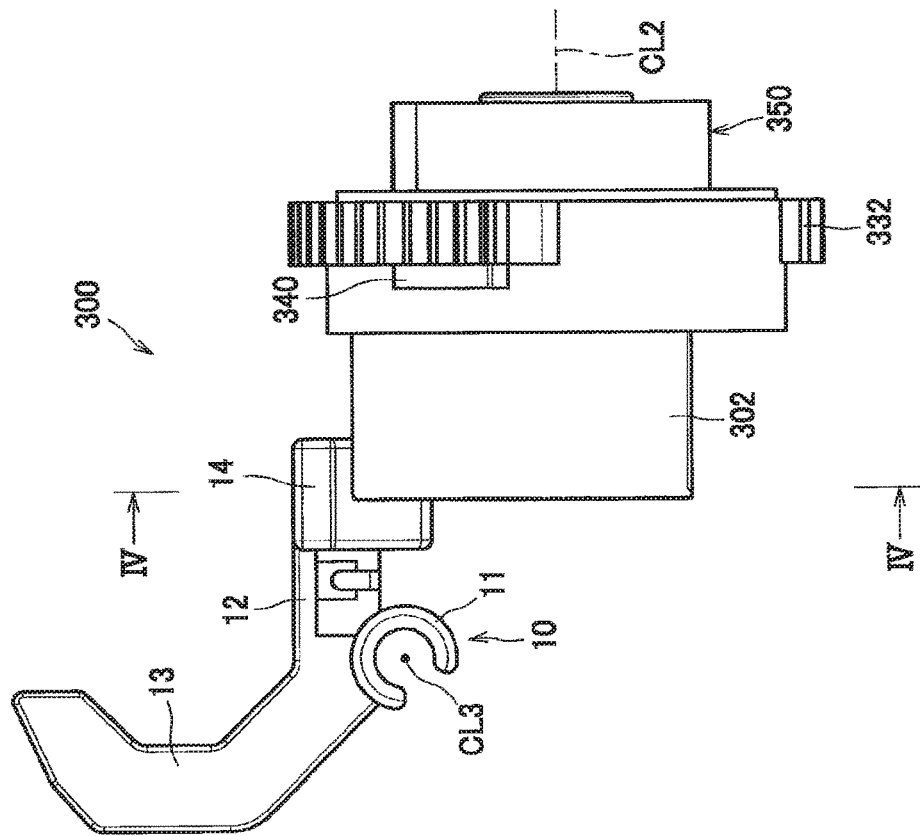
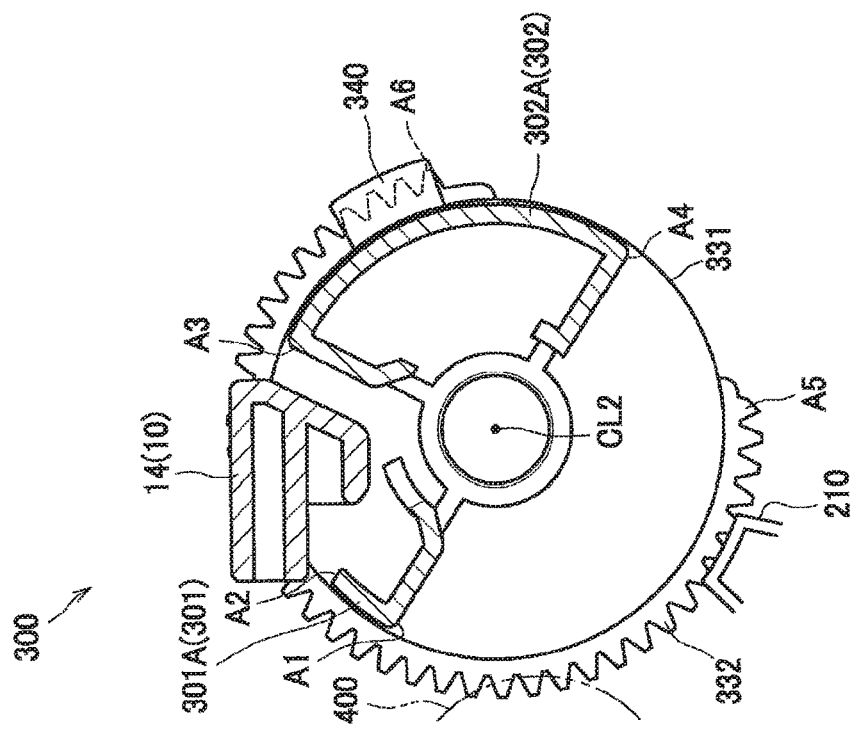

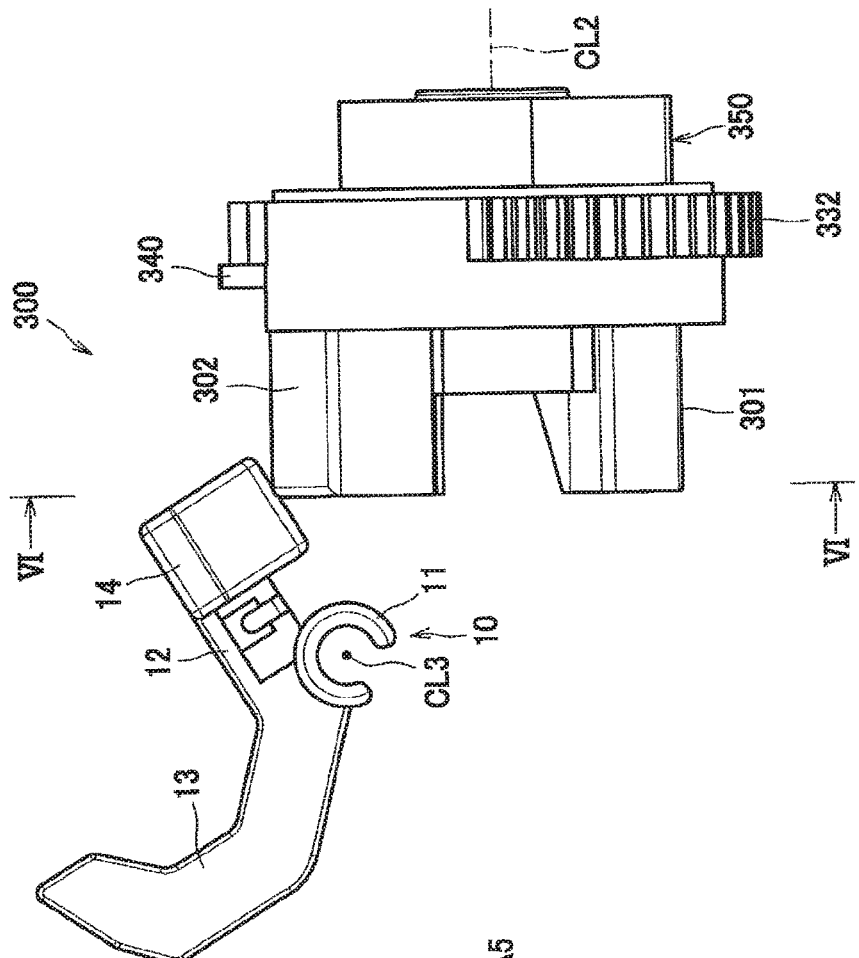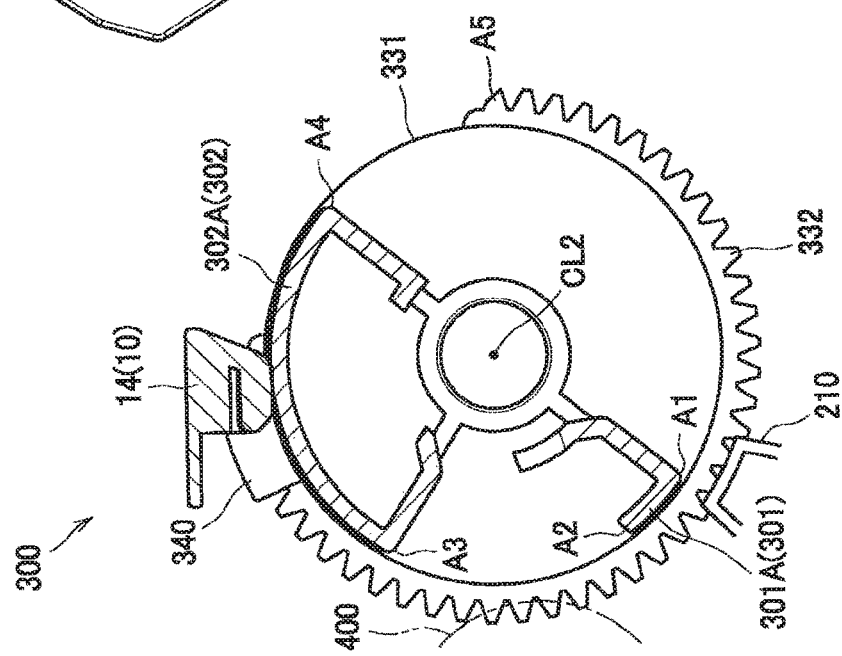

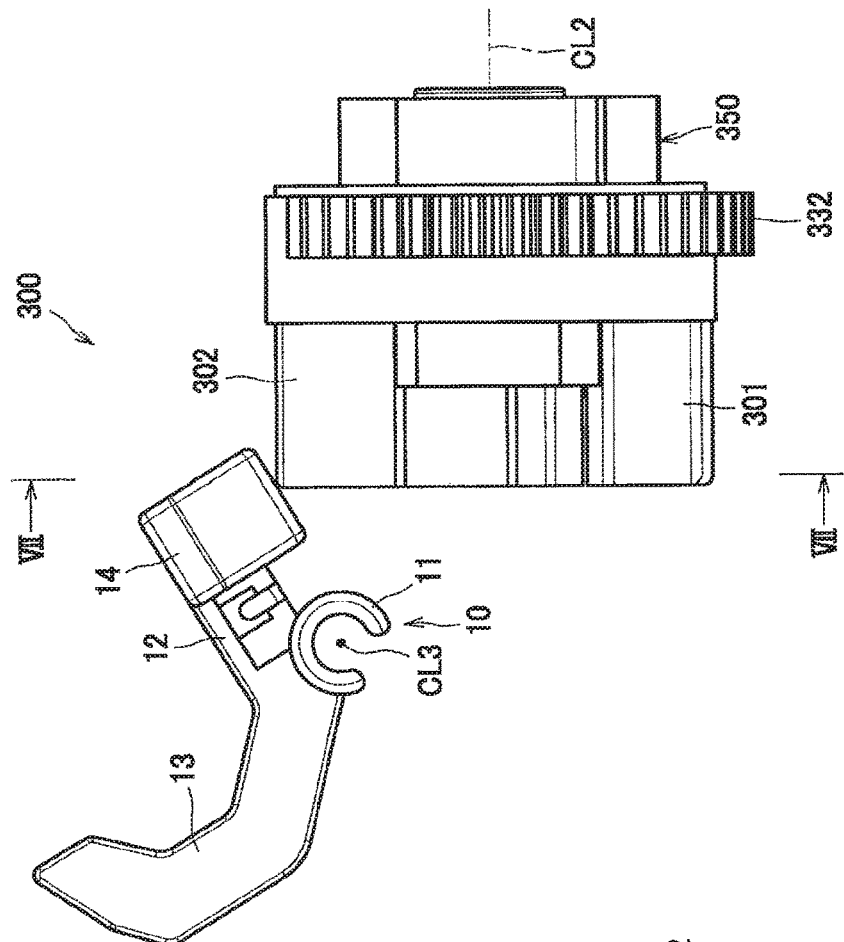
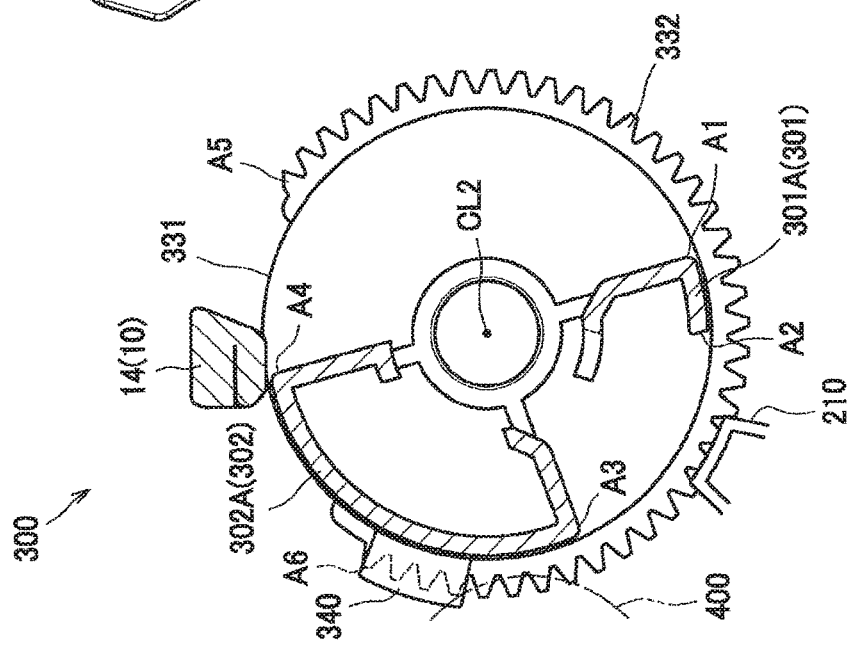
FIG. 12A
FIG. 12B

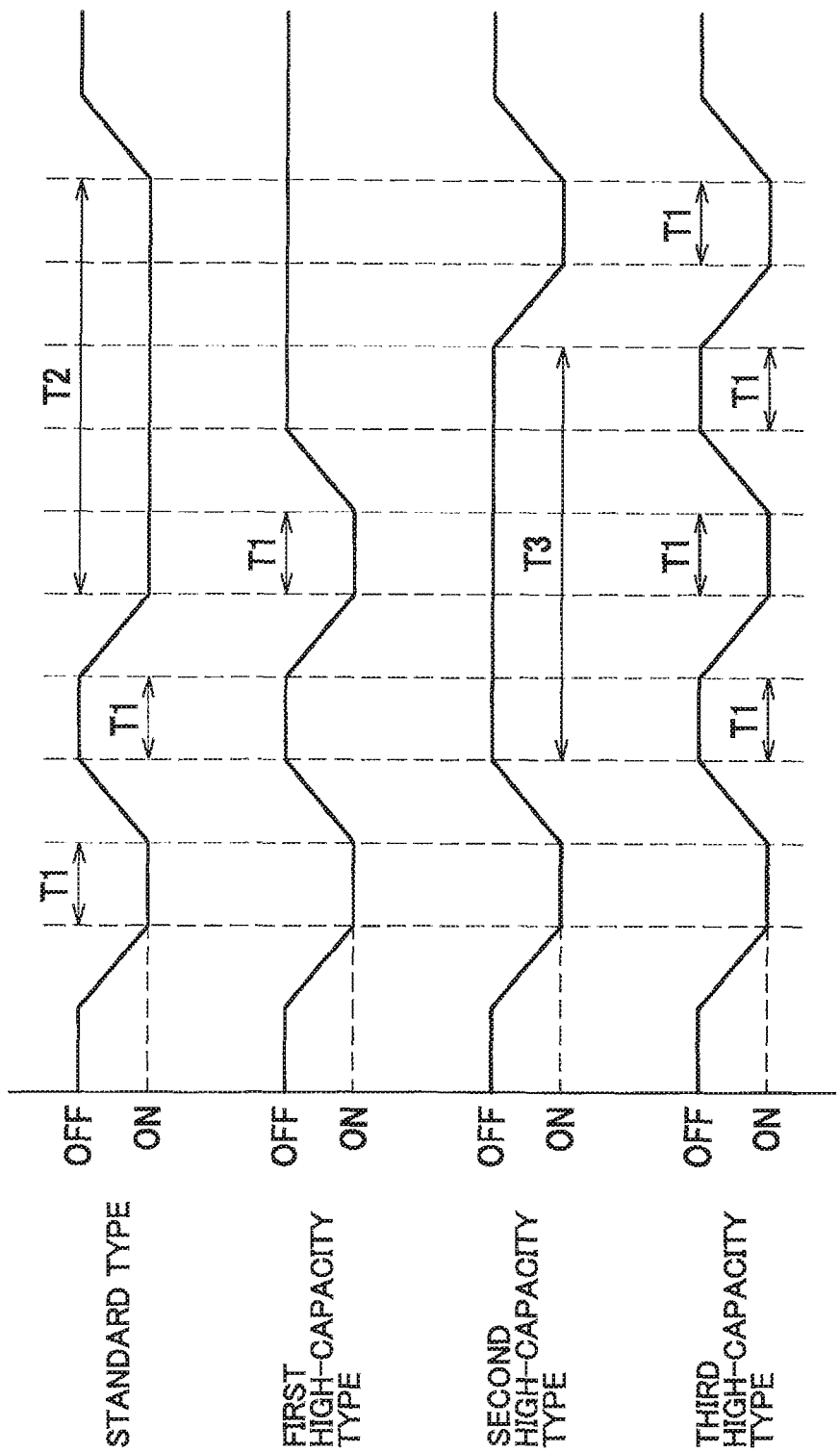

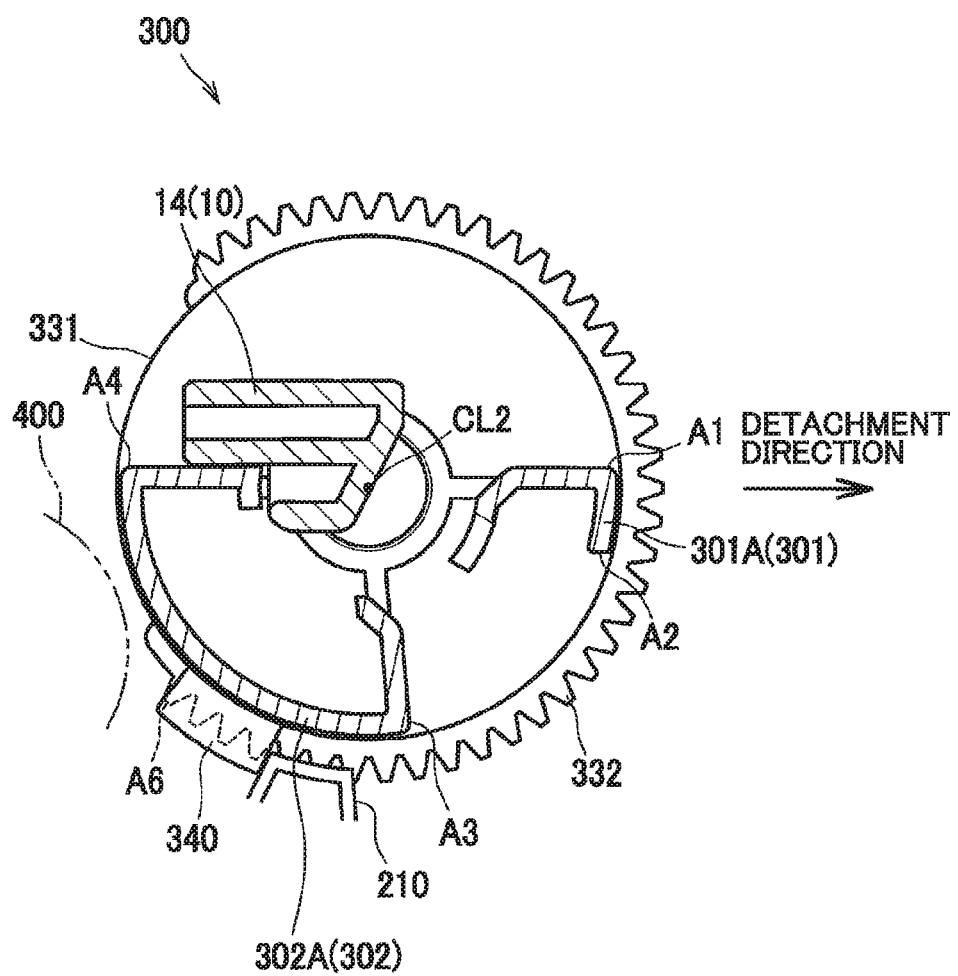

DEVELOPER CARTRIDGE PROVIDED WITH GEAR HAVING PROTRUSIONS FOR DETECTION

CROSS REFERENCE TO RELATED APPLICATION

This application claims priority from Japanese Patent Application No. 2016-035464 filed Feb. 26, 2016. The entire content of the priority application is incorporated herein by reference.

TECHNICAL FIELD

The present disclosure relates to an electro-photographic type image-forming apparatus.

BACKGROUND

There is known a developer cartridge provided with a gear including a rib-shaped detection portion. This detection portion is engageable with an actuator provided in an image-forming apparatus to perform new product detection or specification detection of the developer cartridge (for example, see Japanese Patent Application Publication no. 2011-203362). In this developer cartridge, the rib-shaped detection portion is rotatable together with the gear and has a narrow end that is configured to press the actuator to pivotally move the actuator. An optical sensor is configured to detect the pivotal movement of the actuator. The optical sensor becomes ON when detecting the pivotal movement of the actuator, while the optical sensor becomes OFF when the narrow end of the detection portion is separated from the actuator.

Here, the optical sensor may be configured to be ON when light is received by a light-receiving element, and to be OFF when light is not received by the light-receiving element, for example. Alternatively, the optical sensor may be configured to become ON when light is not received by the light-receiving element, and become OFF when light is received by the light-receiving element. In the following description, for the sake of convenience, a period of time during which the optical sensor is in its ON state will be referred to as "detection period" and a period of time during which the optical sensor is in its OFF state will be referred to as "non-detection period".

SUMMARY

However, in the above-described configuration of the gear, since the actuator is pressed by the end of the detection portion having a narrow width, the period of time in which the optical sensor is in its ON state (i.e., the detection period) becomes inevitably short. As a result, high accuracy in the detection period is hard to be expected.

In view of the foregoing, it is an object of the present disclosure to provide a developer cartridge that can prolong the detection period.

In order to attain the above and other objects, the disclosure provides a developer cartridge including: a first gear and a second gear. The first gear is configured to rotate about a first axis extending in an axial direction and includes gear teeth. The second gear is configured to rotate in a rotation direction about a second axis extending in the axial direction and has a peripheral surface extending in the rotation direction. The second gear includes: an engagement portion formed on a part of the peripheral surface and extending in the rotation direction; a first protrusion protruding in the axial direction and extending in the rotation direction; and a second protrusion protruding in the axial direction and extending in the rotation direction. The engagement portion is configured to engage the gear teeth. The first protrusion has a first end and a second end opposite to each other in the rotation direction, the second end being arranged closer to the second protrusion than the first end is to the second protrusion. The first protrusion and the second protrusion are configured to move together with the engagement portion. The first protrusion and the second protrusion are arranged to be spaced apart from each other in the rotation direction. The second protrusion has a third end and a fourth end opposite to each other in the rotation direction, the fourth end being arranged farther away from the first protrusion than the third end is from the first protrusion. The first end and the second end define a first angle therebetween about the second axis. The second end and the third end define a second angle therebetween about the second axis. The first angle is smaller than the second angle.

BRIEF DESCRIPTION OF THE DRAWINGS

In the drawings:

FIG. 4A is a perspective view of a detection gear provided at the developing cartridge (standard-type) according to the embodiment as viewed from outward thereof in an axial direction;

FIG. 4B is a perspective view of the detection gear provided at the developing cartridge (standard-type) according to the embodiment as viewed from inward thereof in the axial direction;

FIGS. 6A and 6B are views illustrating a positional relationship between a lever and the detection gear at its first position in the developing cartridge (standard-type) according to the embodiment, wherein FIG. 6A is a cross-sectional view taken along a plane I-I shown in FIG. 6B;

FIGS. 7A and 7B are views illustrating a state where the lever has been lifted up to its detection position by a first protrusion of the detection gear in the developing cartridge (standard-type) according to the embodiment, wherein FIG. 7A is a cross-sectional view taken along a plane II-II shown in FIG. 7B;

FIGS. 8A and 8B are views illustrating a state where the lever is about to be disengaged from the first protrusion of the detection gear in the developing cartridge (standard-type) according to the embodiment, wherein FIG. 8A is a cross-sectional view taken along a plane III-III shown in FIG. 8B;

FIGS. 9A and 9B are views illustrating a state where the lever is located between the first protrusion and a second protrusion of the detection gear in the developing cartridge (standard-type) according to the embodiment, wherein FIG. 9A is a cross-sectional view taken along a plane IV-IV shown in FIG. 9B;

FIGS. 10A and 10B are views illustrating a state where the lever has been lifted up to its detection position by the second protrusion of the detection gear in the developing cartridge (standard-type) according to the embodiment, wherein FIG. 10A is a cross-sectional view taken along a plane V-V shown in FIG. 10B;

FIGS. 11A and 11B are views illustrating a state where the lever is located near a midpoint on an outer peripheral surface of the second protrusion of the detection gear in the developing cartridge (standard-type) according to the embodiment, wherein FIG. 11A is a cross-sectional view taken along a plane VI-VI shown in FIG. 11B;

FIGS. 12A and 12B are views illustrating a state where the lever is about to be disengaged from the second protrusion of the detection gear in the developing cartridge (standard-type) according to the embodiment, wherein FIG. 12A is a cross-sectional view taken along a plane VII-VII shown in FIG. 12B;

FIGS. 13A and 13B are views illustrating a state where the lever has been disengaged from the second protrusion of the detection gear in the developing cartridge (standard-type) according to the embodiment, wherein FIG. 13A is a cross-sectional view taken along a plane VIII-VIII shown in FIG. 13B;

FIG. 20 is a time chart illustrating differences in signals indicative of detection period and non-detection period in the detection gears of the respective types of developing cartridges;

FIG. 21 is a cross-sectional view illustrating a hypothetical state where a tip end of the lever is get caught by the second protrusion when the developing cartridge (standard-type) according to the embodiment is to be detached from a drawer;

DETAILED DESCRIPTION

Hereinafter, a detailed structure of a developer cartridge 8 according to an embodiment of the disclosure will be described while referring to accompanying drawings.

Figure 1:
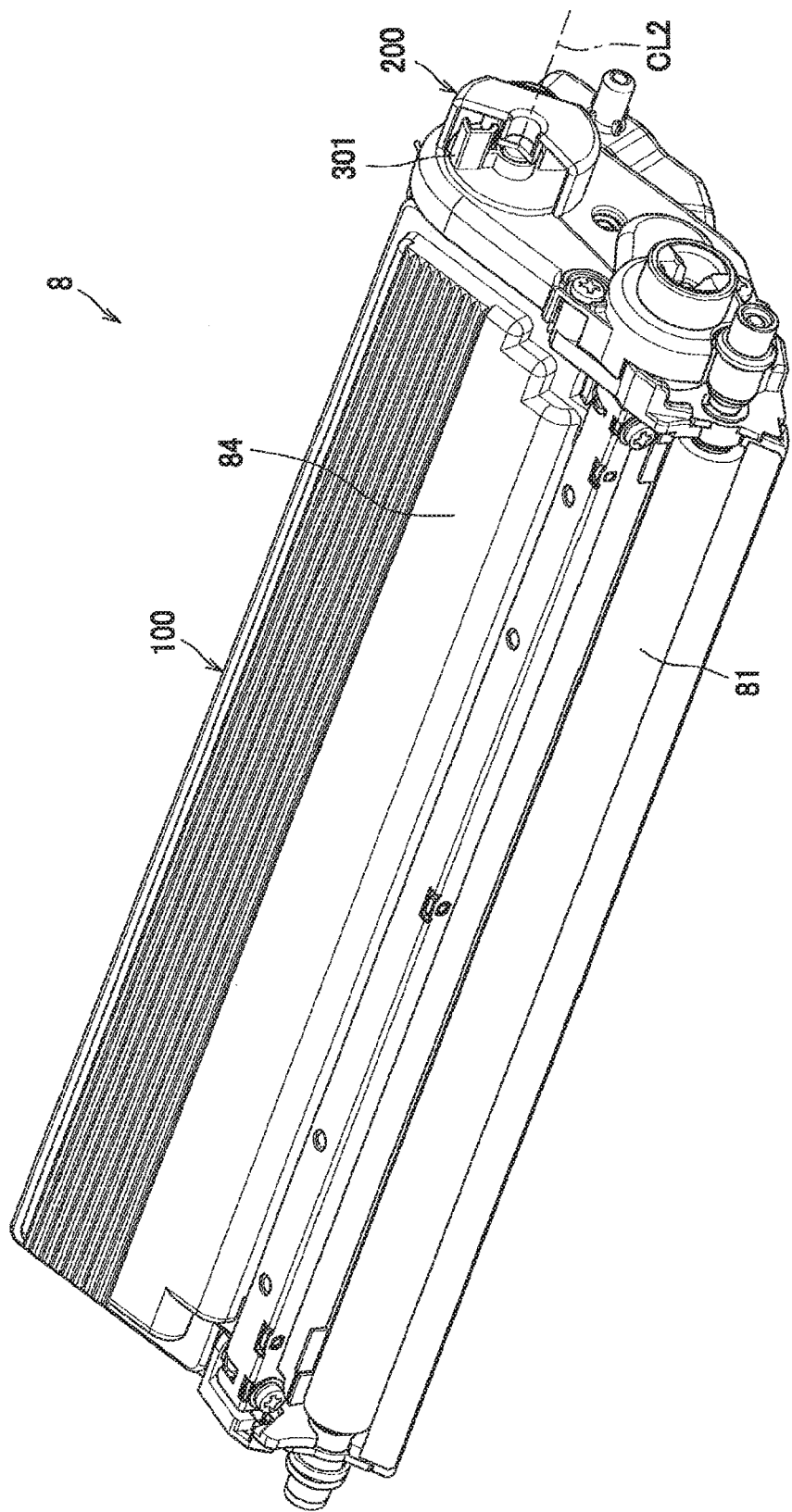
FIG. 1 is a perspective view of a developing cartridge (standard-type) according to an embodiment of the disclosure.
Figure 2:
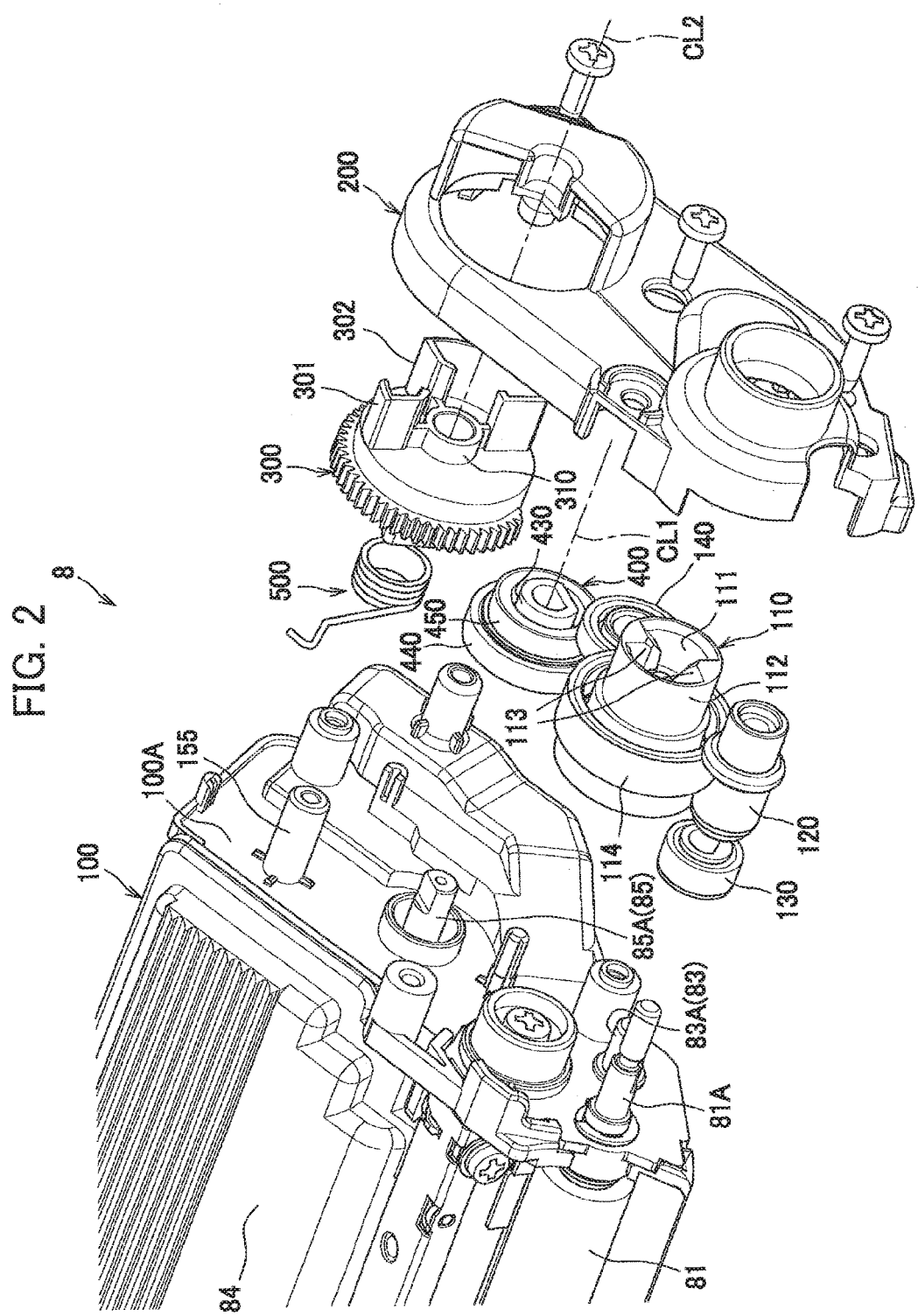
FIG. 2 is an exploded perspective view of components constituting the developing cartridge (standard-type) according to the embodiment.

As illustrated in FIGS. 1 and 2, the developer cartridge 8 includes a developing roller 81 extending in an axial direction, a housing 100, a gear cover 200, a first protrusion 301, and a second protrusion 302. The first protrusion 301 and the second protrusion 302 are exposed outside through the gear cover 200. Specifically, the first protrusion 301 and the second protrusion 302 are provided at a detection gear 300 that is rotatable about a second axis CL2 extending in the axial direction. Within the housing 100 disposed are a developer accommodating portion 84 that accommodates developer, an agitator 85 configured to agitate the developer in the developer accommodating portion 84, and a supply roller 83 configured to supply the developer to the developing roller 81.

Figure 3:
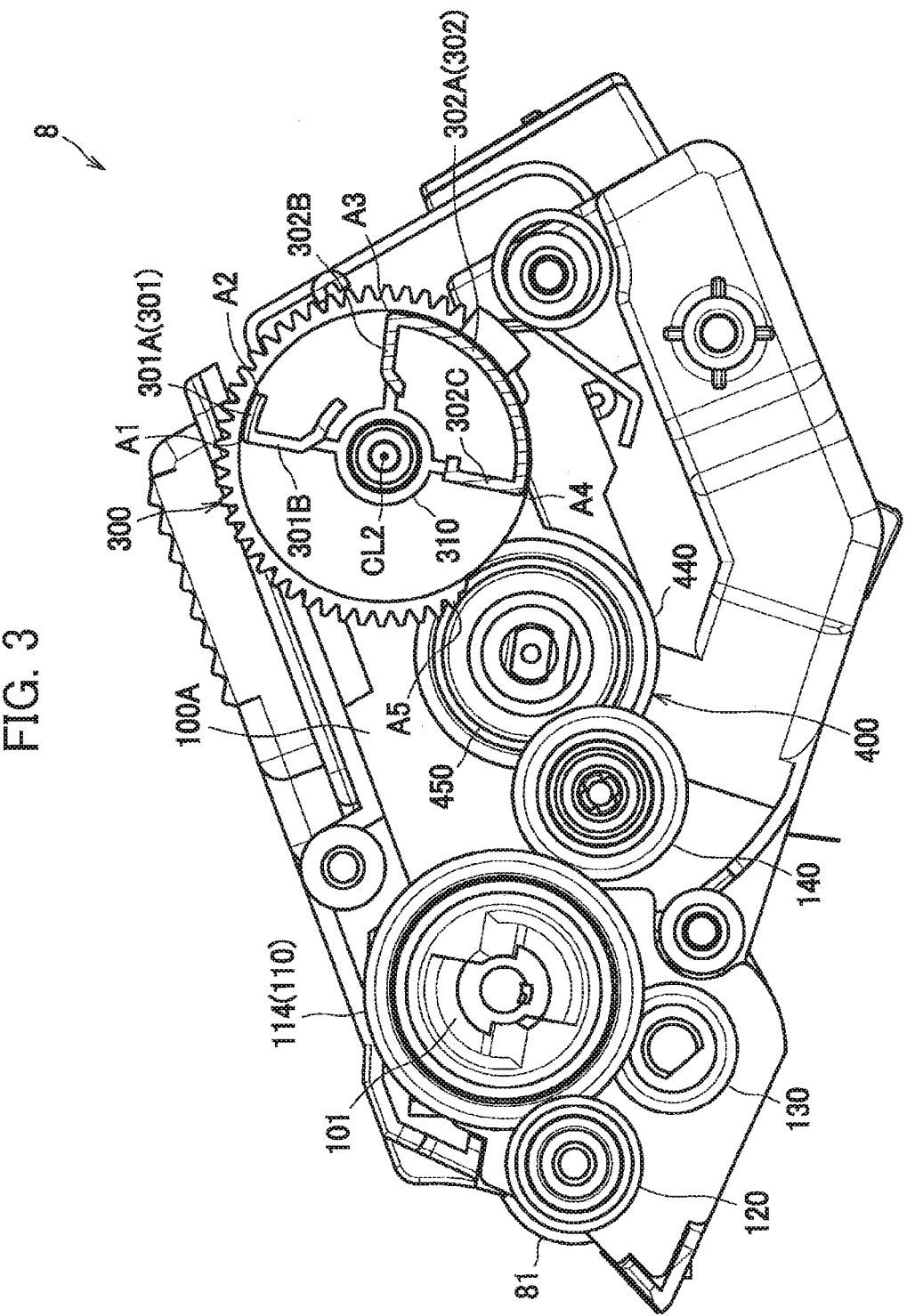
FIG. 3 is a side view of the developing cartridge (standard-type) according to the embodiment in which a gear cover is detached.

As illustrated in FIG. 3, the first protrusion 301 includes an arcuate wall 301A, a first end A4, a second end A2, and an extension wall 301B. The arcuate wall 301A extends in a rotation direction of the detection gear 300. The first end A1 and second end A2 constitute one end and another end of the arcuate wall 301A in the rotation direction, respectively. The extension wall 301B extends radially inward from the first end A1. The arcuate wall 301A is formed in an arcuate shape centered on the second axis CL2.

The second end A2 is located opposite the first end A1 in the rotation direction, and is disposed closer to the second protrusion 302 than the first end A1 is to the second protrusion 302 in the rotation direction. The arcuate wall 301A and the extension wall 301B are disposed respectively at positions offset from the second axis CL2.

The second protrusion 302 is disposed upstream of and in separation from the first protrusion 301 in the rotation direction of the detection gear 300. The second protrusion 302 includes an outer circumferential wall 302A, a third end A3, a fourth end A4, a first extension wall 302B and a second extension wall 302C. The outer circumferential wall 302A extends in the rotation direction of the detection gear 300. The third end A3 constitutes one end of the outer circumferential wall 302A in the rotation direction, whereas the fourth end A4 constitutes the other end of the outer circumferential wall 302A in the rotation direction. The first extension wall 302B extends radially inward from the third end A3. The second extension wall 302C extends radially inward from the fourth end A4. The outer circumferential wall 302A is formed to have an arcuate shape centered on the second axis CL2. The outer circumferential wall 302A defines a radius that is substantially equal to a radius of the arcuate wall 301A of the first protrusion 301.

The fourth end A4 is located opposite the third end A3 in the rotation direction, and is disposed farther away from the first protrusion 301 than the third end A3 is from the first protrusion 301 in the rotation direction. The outer circumferential wall 302A, the first extension wall 302B, and the second extension wall 302C are all disposed offset from the second axis CL2.

As illustrated in FIGS. 2 and 3, the housing 100 includes a first outer surface 100A, and a second outer surface (not illustrated) opposite the first outer surface 100A in the axial direction. On the first outer surface 100A, a gear train including the detection gear 300 is disposed. Specifically, at the first outer surface 100A, rotatably provided are a coupling 110, a developing-roller drive gear 120, a supply-roller drive gear 130, an idle gear 140, a transmission gear 400 as an example of a first gear, and the detection gear 300 as an example of a second gear. The gear cover 200 is attached to the first outer surface 100A such that the coupling 110, the developing-roller drive gear 120, the supply roller driving gear 130, the idle gear 140, the transmission gear 400, and a part of the detection gear 300 are covered with the gear cover 200.

The coupling 110 includes a coupling portion 111, and a coupling gear 114 rotatable with the coupling portion 111. The coupling portion 111 is configured to receive a driving force that is inputted from a motor (not shown) disposed in a main body of the image-forming apparatus. The coupling portion 111 includes a cylindrical part 112 having a cylindrical shape that extends in the axial direction, and a pair of convex parts 113 that protrudes radially inward from an inner peripheral surface of the cylindrical portion 112. The convex portions 113 can engage with a body-side coupling (not shown) disposed in the main body of the image-forming apparatus. The coupling gear 114 is formed integrally with the coupling portion 111 to be coaxial therewith.

The developing-roller drive gear 120 is supported by a rotation shaft 81A of the developing roller 81 so as to be rotatable together with the developing roller 81. The developing-roller drive gear 120 is meshed with the coupling gear 114 of the coupling 110. The supply-roller drive gear 130 is supported by a rotation shaft 83A of the supply roller 83 so as to be rotatable together with the supply roller 83. The supply-roller drive gear 130 is meshed with the coupling gear 114 of the coupling 110. The idle gear 140 is meshed with the coupling gear 114 and the transmission gear 400.

The transmission gear 400 is rotatable about a first axis CL1 extending in the axial direction. The transmission gear 400 is supported by a rotation shaft 85A of the agitator 85 so as to be rotatable together with the agitator 85. The transmission gear 400 integrally includes a shaft portion 430, a large-diameter gear portion 440, and a small-diameter gear portion 450. The shaft portion 430 has a substantially cylindrical shape centered on the first axis CL1. Gear teeth are formed on an entire circumference of the large-diameter gear portion 440 and on an entire circumference of the small-diameter gear portion 450, respectively. The large-diameter gear portion 440 has a diameter larger than a diameter of the small-diameter gear portion 450.

In the axial direction, a distance from the first outer surface 100A to the large-diameter gear portion 440 is smaller than a distance from the first outer surface 100A to the small-diameter gear portion 450. The large-diameter gear portion 440 meshes the idle gear 140, while the small-diameter gear portion 450 is meshed with the detection gear 300.

The detection gear 300 is a sector gear that can rotate as long as the driving force is received from the transmission gear 400. When the developer cartridge 8 is in a brand-new state, the detection gear 300 (the first protrusion 301 and second protrusion 302) is located at a first position shown in FIG. 6A. While the detection gear 300 receives the driving force from the transmission gear 400, the detection gear 300 (the first protrusion 301 and second protrusion 302) moves toward a second position shown in FIG. 13A. Once the detection gear 300 (the first protrusion 301 and second protrusion 302) reaches the second position, the detection gear 300 halts its rotation.

Specifically, as illustrated in FIG. 4A, the detection gear 300 integrally includes the first protrusion 301, the second protrusion 302, a shaft portion 310, a disc-shaped portion 320, a toothless gear portion 330, a projection 340, and a spring engaging portion 350 (see FIG. 4B). The shaft portion 310 has a cylindrical shape that extends in the axial direction and that is centered on the second axis CL2. The shaft portion 310 is rotatable relative to the housing 100. More specifically, as illustrated in FIG. 2, the shaft portion 310 is rotatably supported by a boss 155 protruding from the first outer surface 100A of the housing 100.

As illustrated in FIG. 4A, the disc-shaped portion 320 is formed in a disc-like shape centered on the second axis CL2. The disc-shaped portion 320 extends radially outward from a generally center portion of the shaft portion 310 in the axial direction. The disc-shaped portion 320 has a first surface facing the housing 100 and a second surface opposite the first surface (see FIG. 2). The first protrusion 301 and the second protrusion 302 protrude from the second surface of the disc-shaped portion 320. The first protrusion 301 and second protrusion 302 are therefore rotatable together with the disc-shaped portion 320.

The toothless gear portion 330 includes a toothless portion 331 and a toothed gear portion 332. The toothless portion 331 has a peripheral surface that forms a portion of an outer circumferential surface of the disc-shaped portion 320. That is, the toothless portion 331 constitutes part of the outer circumferential surface of the disc-shaped portion 320. The toothed gear portion 332 is arranged at the same position as the toothless portion 331 in the axial direction. The toothed gear portion 332 includes gear teeth protruding radially outward from the outer circumferential surface of the disc-shaped portion 320. That is, the toothed gear portion 332 is provided to extend along a part of the outer circumferential surface of the disc-shaped portion 320 in the rotation direction of the detection gear 300. The toothed gear portion 332 is an example of an engagement portion.

The toothed gear portion 332 includes a fifth end A5 and a sixth end A6 opposite to each other in the in the rotation direction. The fifth end A5 is engaged with the small-diameter gear portion 450 of the transmission gear 400 when the developer cartridge 8 is new (see FIG. 3). That is, when the detection gear 300 is in the first position, the fifth end A5 is engaged with the transmission gear 400.

The projection 340 is disposed on the outer circumferential surface of the disc-shaped portion 320 at a position near the sixth end A6 of the toothed gear portion 332 in the rotation direction. In the axial direction, the projection 340 is provided at a position closer to the second protrusion 302 than the sixth end A6 of the toothed gear portion 332 is to the second protrusion 302. That is, in the axial direction, a distance from the projection 340 to the housing 100 is greater than a distance from the toothed gear portion 332 to the housing 100.

Figure 5:
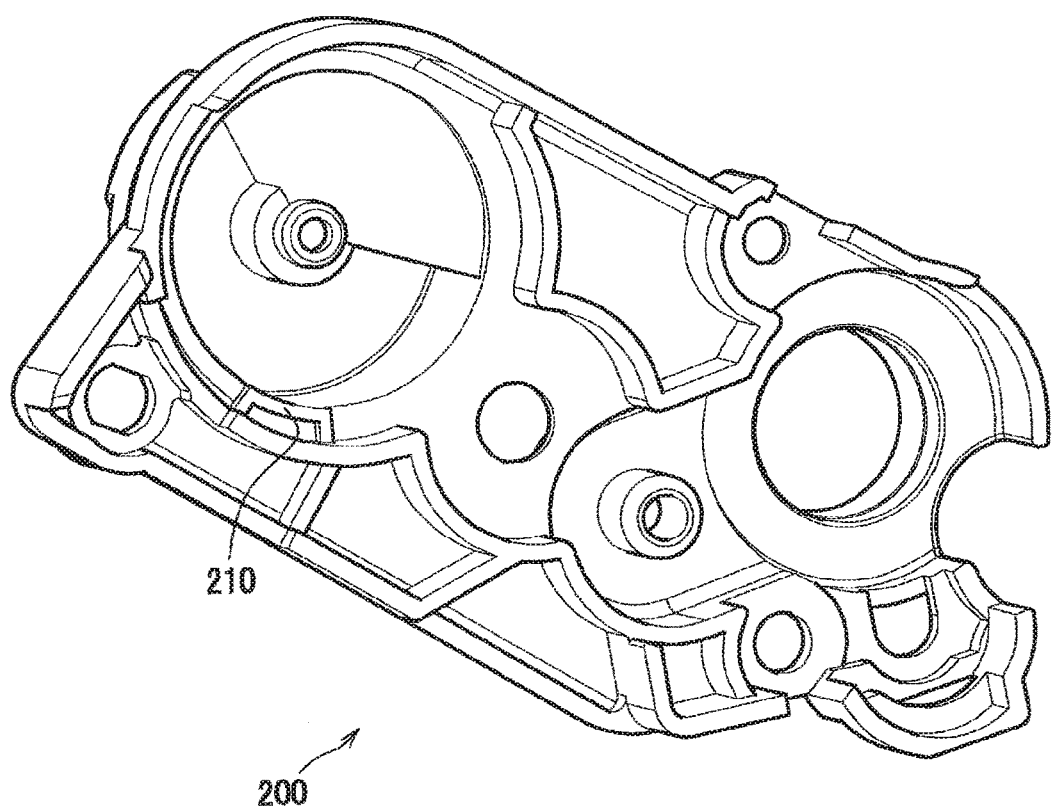
FIG. 5 is a perspective view of the gear cover as viewed from inward thereof in the axial direction.

The projection 340 protrudes from the outer circumferential surface of the disc-shaped portion 320 further radially outward than the toothed gear portion 332 does. The projection 340 has an arcuate shape having a predetermined length in the rotation direction and extending along the outer circumferential surface of the disc-shaped portion 320. The projection 340 is configured to engage with a restricting portion 210 (see FIG. 5) formed in the gear cover 200 in the rotation direction. Specifically, when the detection gear 300 is in the second position, the projection 340 engages with the restricting portion 210 (see FIG. 15).

As illustrated in FIG. 4B, the spring engaging portion 350 is adapted to be engaged with a torsion spring 500 (see FIG. 2) that will be described later. The spring engaging portion 350 protrudes from the first surface of the disc-shaped portion 320 facing the housing 100. In the axial direction, the spring engaging portion 350 has a length that is larger than a length β of the toothed gear portion 332 (see FIG. 6B: α>β).

The spring engaging portion 350 integrally includes a first engaging portion 351, a second engaging portion 352, a third engaging portion 353, a fourth engaging portion 354, a fifth engaging portion 355, a sixth engaging portion 356, and a seventh engaging portion 357.

The first engaging portion 351 is a portion that engages with the torsion spring 500 (see FIGS. 13A and 13B) when the detection gear 300 (first protrusion 301 and the second protrusion 302) is located at the first position. The first engaging portion 351 is disposed between the second engaging portion 352 and the seventh engaging portion 357, and is formed to protrude further radially outward relative to the engaging portions 352 and 357. The first engaging portion 351 has a substantially V shape that is tapered toward outward in a radial direction of the detection gear 300 in a cross-sectional view.

The second engaging portion 352 is an arcuate-shaped wall centered on the second axis CL2. The second engaging portion 352 is connected to an upstream end of the first engaging portion 351 in the rotation direction of the detection gear 300. The third engaging portion 353 is formed to extend radially outward from an upstream end of the second engaging portion 352 in the rotation direction of the detection gear 300.

The fourth engaging portion 354 is an arcuate-shaped wall centered on the second axis CL2. The fourth engaging portion 354 is formed to have a radius larger than a radius of the second engaging portion 352. The fourth engaging portion 354 extends from a radially outer end of the third engaging portion 353 toward upstream in the rotation direction of the detection gear 300. The fourth engaging portion 354 has an upstream end that is disposed substantially opposite to the second engaging portion 352 with respect to the second axis CL2.

The seventh engaging portion 357 is an arcuate-shaped wall centered on the second axis CL2. The seventh engaging portion 357 is formed to have a radius substantially equal to the radius of the second engaging portion 352. The seventh engaging portion 357 extends from a downstream end of the first engaging portion 351 toward downstream in the rotation direction of the detection gear 300.

The sixth engaging portion 356 extends radially outward from a downstream end of the seventh engaging portion 357 in the rotation direction of the detection gear 300. The fifth engaging portion 355 extends from an upstream end of the fourth engaging portion 354 to a downstream end of the sixth engaging portion 356. The fifth engaging portion 355 and the sixth engaging portion 356 define a substantially V-shaped convex shape that is tapered toward outward in the radial direction in a cross-sectional view.

Figure 14:
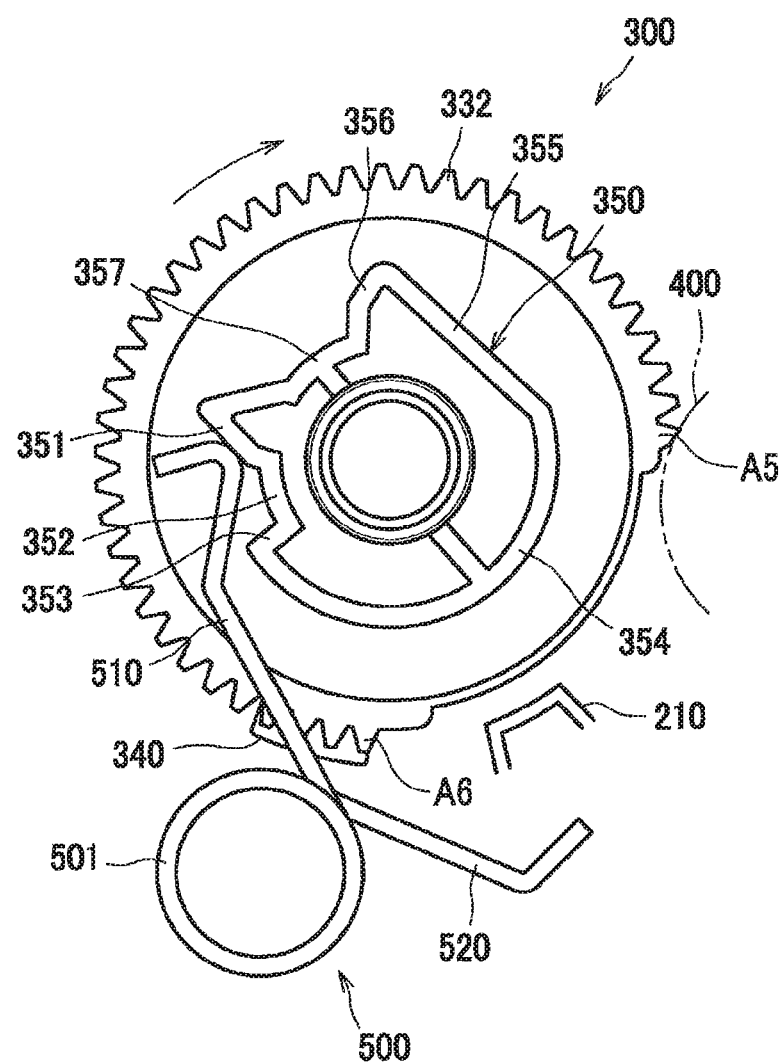
FIG. 14 is a view illustrating a relationship between a torsion spring and a spring engagement part of the detection gear at its first position in the developing cartridge (standard-type) according to the embodiment.

As illustrated in FIG. 14, the torsion spring 500 is an example of a spring and is a torsion coil spring in the embodiment. Specifically, the torsion spring 500 includes a coil portion 501, a first arm 510, and a second arm 520. The first arm 510 extends from the coil portion 501 toward the spring engaging portion 350 of the detection gear 300. The second arm 520 extends from the coil portion 501 in a direction different from a direction in which the first arm 510 extends. The coil portion 501 defines a central axis parallel to the axial direction. The first arm 510 has a tip end portion that is engaged with the spring engaging portion 350. The second arm 520 has a tip end portion that is engages with the housing 100. The first arm 510 and the second arm 520 extend to intersect each other.

Next, positions and sizes of the first protrusion 301 and second protrusion 302 will be described in detail with reference to FIG. 6A.

As illustrated in FIG. 6A, the second protrusion 302 has a length in the rotation direction that is larger than a length of the first protrusion 301 in the rotation direction. Specifically, in the first protrusion 301, the first end A1 and the second end A2 define an angle θ1 therebetween about the second axis CL2. This angle θ1 may be set, for example, in a range from 15° to 21°, and more preferably from 17° to 20°. In this embodiment, the first angle θ1 for the first protrusion 301 is 19°. The angle θ1 is an example of a first angle.

On the other hand, in the second protrusion 302, the third end A3 and the fourth end A4 define an angle θ2 therebetween about the second axis CL2. This angle θ2 may be 105°, for example. The angle θ2 is an example of a third angle.

An angle θ3 about the second axis CL2 defined between the second end A2 of the first protrusion 301 and the third end A3 of the second protrusion 302 may range from 62° to 69°, and more preferably from 63° to 66°. In this embodiment, the third angle θ3 is 65°. The angle θ3 is an example of a second angle.

Further, a distance D1 from the first end A1 to the second end A2 may be, for example, set in a range from 3.0 mm to 6.0 mm, and more preferably from 3.8 mm to 4.5 mm. In this embodiment, the distance D1 is 4.03 mm.

Here, assume a first direction from the fifth end A5 toward the sixth end A6 along the toothed gear portion 332, that is, a direction opposite to the rotation direction of the detection gear 300. A length from the fifth end A5 to the second end A2 in the first direction is shorter than a length from the fifth end A5 to the third end A3 in the rotation direction.

In the developer cartridge 8 having the above configuration, the first protrusion 301 and the second protrusion 302 are used for a controller (not shown) to determine whether the developer cartridge 8 is a new product or to specify a specification of the developer cartridge 8. Next, how new product determination and specification identification according to the embodiment are performed will be described below in brief.

It should be noted that the detection gear 300 described above is employed for a standard-type developer cartridge 8 that can accommodate a prescribed amount of developer that is defined as a "standard" amount.

If the developer cartridge 8 is a new product, the detection gear 300 is arranged at the first position shown in FIG. 6A. The first protrusion 301 and the second protrusion 302 are respectively disposed at the positions illustrated in FIG. 6A. When the new developer cartridge 8 is attached to the main body of the image-forming apparatus, the first protrusion 301 and the second protrusion 302 are arranged to be spaced, by a slight gap, from a lever 10 (see FIG. 6B) disposed in the main body of the image-forming apparatus.

Here, in this embodiment, the main body of the image-forming apparatus is assumed to include: a box-shaped body casing having front, rear, right, and left side walls and a top wall; and a drawer slidable relative to the casing in a horizontal direction. Further, the lever 10 is assumed to be pivotably movable relative to the drawer about a third axis CL3 extending in the horizontal direction (see FIG. 6B, for example).

More specifically, the lever 10 is pivotable between a non-detection position illustrated in FIG. 6B and a detection position illustrated in FIG. 7B. The lever 10 is normally urged to the non-detection position by a spring (not illustrated). The lever 10 includes a pivot shaft portion 11, a first arm 12 and a second arm 13. The pivot shaft portion 11 is rotatably supported by the drawer. The first arm 12 extends from the pivot shaft portion 11 toward the detection gear 300. The second arm 13 extends from the pivot shaft portion 11 in a direction away from the first arm 12. The first arm 12 has a distal end portion 14 having a wedge-like shape that is tapered toward a distal end thereof in a cross-section perpendicular to the axial direction.

An optical sensor disposed in the body casing is configured to detect pivotal movement of the lever 10. The optical sensor may detect pivotal movement of the lever 10 directly, or indirectly by detecting another lever that can move in accordance with the pivotal movement of the lever 10. In this embodiment, the lever 10 is provided at the drawer, but the lever 10 may be provided at the body casing.

Thereafter, when a printing operation is initiated and a driving force is inputted into the developer cartridge 8, the driving force is transmitted from the transmission gear 400 to the toothed gear portion 332 of the detection gear 300 as illustrated in FIG. 7A, thereby rotating the first protrusion 301 and the second protrusion 302 counterclockwise in the drawing. The rotating first protrusion 301 then comes in contact with the distal end portion 14 of the lever 10 and presses the lever 10 in the rotation direction, and the wedge-shaped distal end portion 14 is moved. When the moving distal end portion 14 reaches an outer surface of the first protrusion 301, the distal end portion 14 is supported by the outer surface to be placed at a position corresponding to the detection position.

When the distal end portion 14 is pushed up to the position corresponding to the detection position in this way, the lever 10 pivots to the detection position as illustrated in FIG. 7B. Accordingly, the lever 10 at the detection position can be detected by the optical sensor. That is, in FIGS. 7A and 7B, the optical sensor has switched to the ON state from the OFF state (FIGS. 6A and 6B). Upon detecting the ON state of the optical sensor, the controller (not illustrated) determines that the developer cartridge 8 is a new product.

Thereafter, while the detection gear 300 rotates by a predetermined rotation angle as sequentially illustrated in FIGS. 7A, 7B, 8A and 8B, the distal end portion 14 is maintained at the position corresponding to the detection position by the arcuate wall 301A of the first protrusion 301.

The lever 10 is thus maintained at the detection position. Here, a period of time in which the lever 10 is maintained at the detection position (hereinafter also referred to as "detection period") is determined to be a predetermined first period T1 (see FIG. 20) by setting the first angle θ1 and the distance D1 as described above.

When the distal end portion 14 is separated from the arcuate wall 301A of the first protrusion 301, the biasing force of the non-illustrated spring causes the lever 10 to pivot toward the non-detection position. As illustrated in FIGS. 9A and 9B, when the distal end portion 14 reaches a position corresponding to the non-detection position, the lever 10 pivots to the non-detection position, and the optical sensor is switched from the ON state to the OFF state. Specifically, while the lever 10 is pivoting from the detection position toward the non-detection position, light emitted from a light-emitting part of the optical sensor is gradually shielded by the lever 10 (or another lever). When the lever 10 reaches the non-detection position, the light is completely blocked and the optical sensor is switched into the OFF state. That is, the optical sensor is completely becomes ON (an amount of light received is generally 100%) when the lever 10 is at the detection position, whereas the optical sensor becomes completely OFF (the amount of light received is generally 0%) when the lever 10 is at the non-detection position.

Thereafter, until the second protrusion 302 comes in contact with the distal end portion 14, the distal end portion 14 is maintained at the position corresponding to the non-detection position and the lever 10 is maintained at the non-detection position. A period of time in which the lever 10 is maintained at the non-detection position between the first protrusion 301 and the second protrusion 302 (hereinafter also referred to as "non-detection period") is substantially equal to the detection period by setting the third angle θ3 as described above.

Figure 10A:
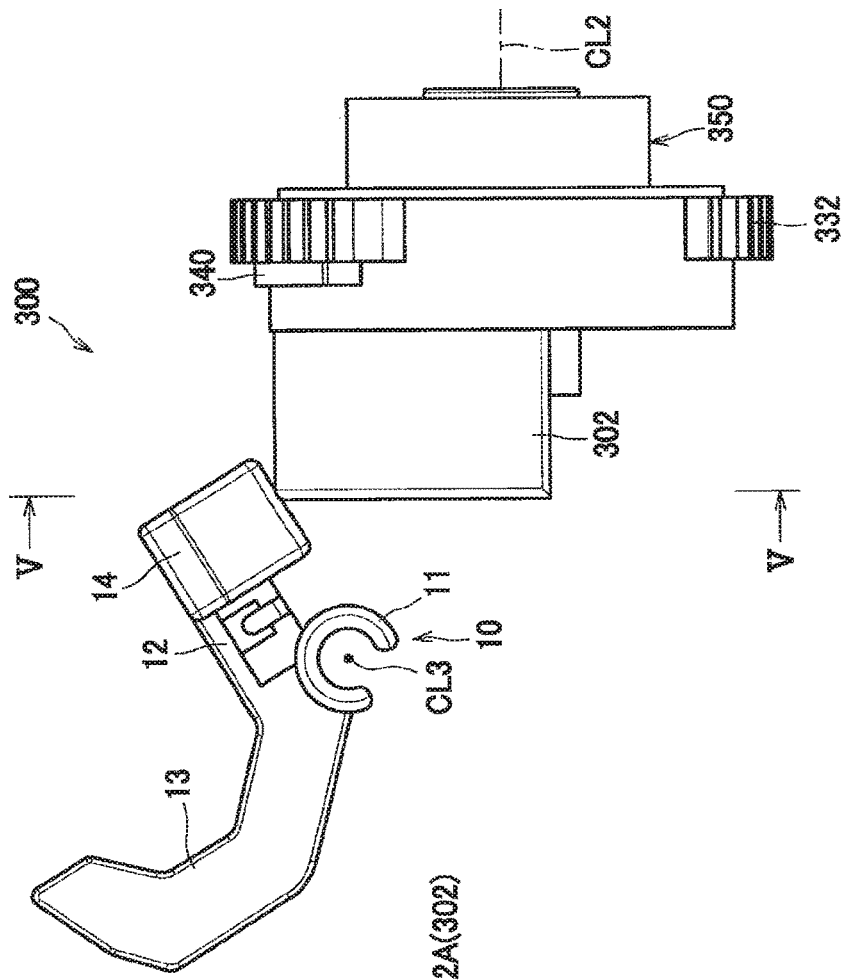
Figure 10B:
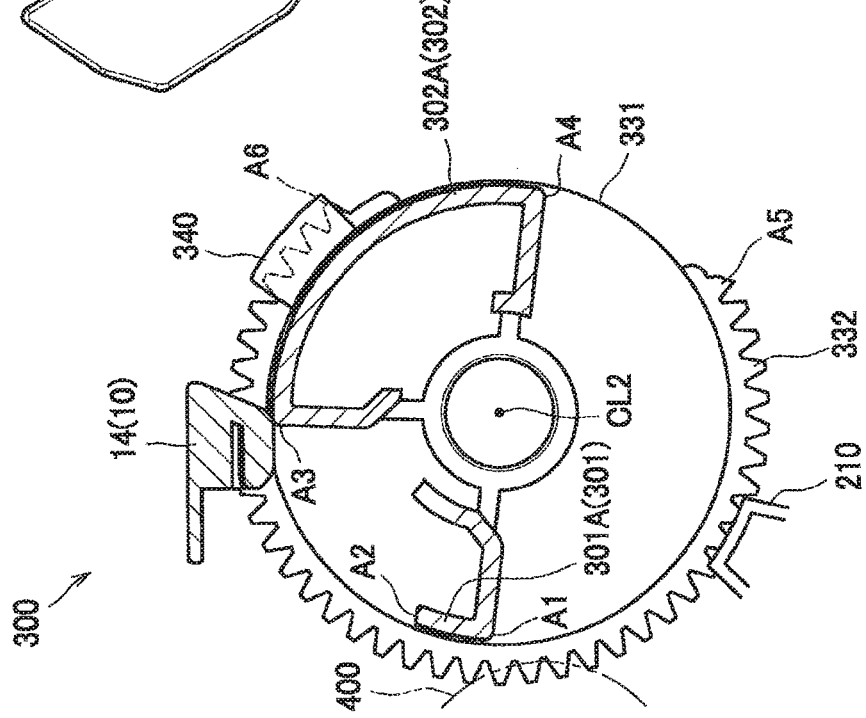

When the rotating second protrusion 302 comes in contact with the distal end portion 14 and presses the distal end portion 14 in the rotation direction, the distal end portion 14 moves again up toward the position corresponding to the detection position. When the distal end portion 14 again reaches the position corresponding to the detection position as illustrated in FIG. 10A and 10B, the lever 10 reaches the detection position and the optical sensor is switched from the OFF state to the ON state.

Thereafter, while the distal end portion 14 is supported by the outer circumferential wall 302A of the second protrusion 302 as sequentially illustrated in FIGS. 11A, 11B, 12A and 12B, the lever 10 is maintained at the detection position. Here, since the second angle θ2 is set as described above, that is, since the length of the outer circumferential wall 302A in the rotation direction is larger than the length of the arcuate wall 301A in the rotation direction, the detection period for the second time is a second period T2 that is longer than the first period T1. When the detection period for the second time is determined to be the second period T2 longer than the first period T1, the controller (not illustrated) determines that the attached developer cartridge 8 is a standard type.

Figure 13B:
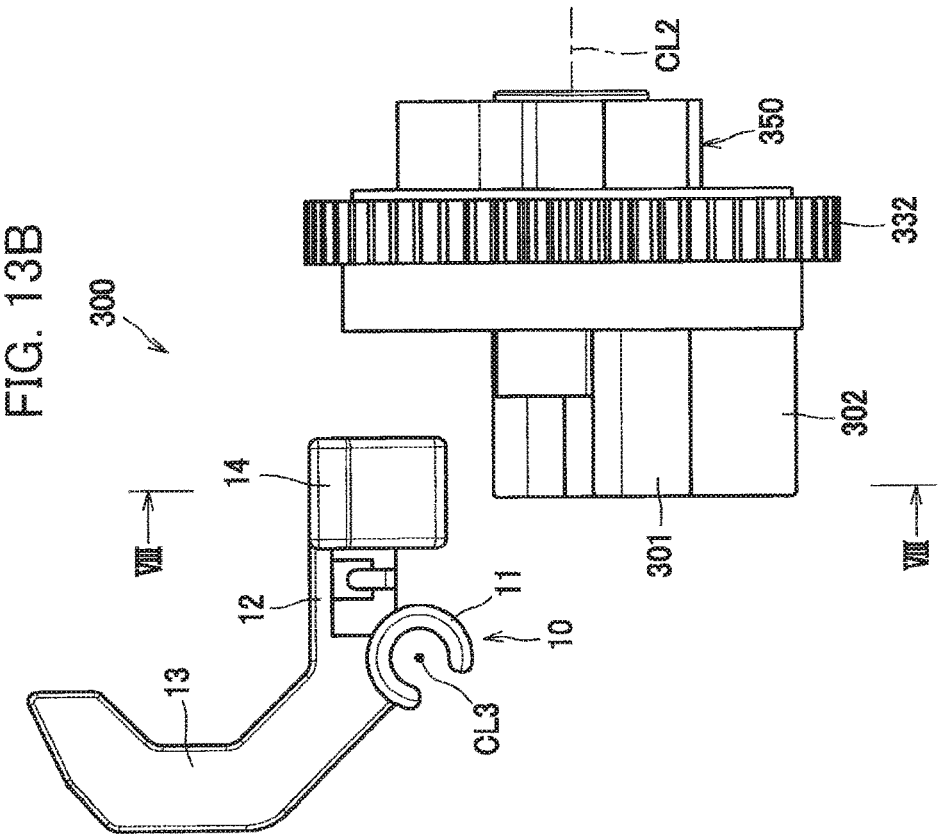
Figure 13A:
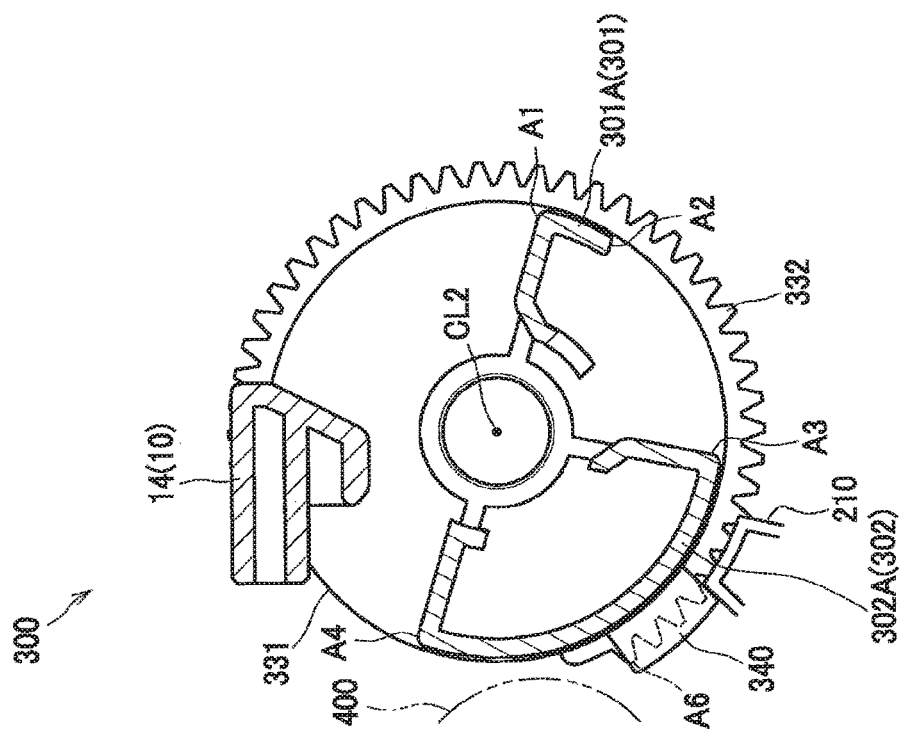

When the distal end portion 14 is separated from the outer circumferential wall 302A of the second protrusion 302, the lever 10 pivots from the detection position to the non-detection position as illustrated in FIGS. 13A and 13B. During the transition from the state shown in FIGS. 12A and 12B to the state shown in FIGS. 13A and 13B, the toothed gear portion 332 of the detection gear 300 is separated from the transmission gear 400. In other words, the sixth end A6 of the toothed gear portion 332 is disengaged from the transmission gear 400 after the sixth end A6 engages the transmission gear 400.

When the toothed gear portion 332 is disengaged from the transmission gear 400 in this way, the torsion spring 500 (see FIG. 14) urges the detection gear 300 downstream in the rotation direction, causing the detection gear 300 to rotate further. This rotation of the detection gear 300 is stopped when the projection 340 abuts against the restricting portion 210. The detection gear 300 is thus maintained at the second position.

When the detection gear 300 is maintained at the second position, the toothless portion 331 faces the transmission gear 400. In other words, in the second position, the toothed gear portion 332 is disposed outside a rotational locus defined by the gear teeth of the transmission gear 400. When the toothless portion 331 faces the transmission gear 400, transmission of the driving force from the transmission gear 400 to the detection gear 300 is interrupted.

Incidentally, the detection gear 300 is maintained at the second position once the developer cartridge 8 is used. If a used developer cartridge 8 is attached to the main body of the image-forming apparatus and a printing operation is initiated, the driving force is not transmitted to the detection gear 300 that is kept at the second position. Accordingly, the optical sensor remains in the OFF state even after a prescribed period of time has elapsed since the printing operation is started. The controller then determines that the attached developer cartridge 8 is old (the developer cartridge 8 is used once or more).

A relationship between the torsion spring 500 and the spring engaging portion 350 will be described below in detail.

When the detection gear 300 is located at the first position, the first arm 510 of the torsion spring 500 engages with the first engaging portion 351 of the detection gear 300 to urge the detection gear 300 downstream in the rotation direction (see FIG. 14). At this time, since the toothed gear portion 332 of the detection gear 300 engages with the transmission gear 400, this engagement prevents the detection gear 300 from rotating by the urging force of the torsion spring 500.

When the driving force is transmitted from the transmission gear 400 to the detection gear 300 to rotate the detection gear 300 in the clockwise direction in the drawing, the first arm 510 of the torsion spring 500 sequentially comes in sliding contact with the second engaging portion 352, the third engaging portion 353, the fourth engaging portion 354, and the fifth engaging portion 355. After the first arm 510 of the torsion spring 500 moves over a tip of the V-shaped convex portion formed by the fifth engaging portion 355 and the sixth engaging portion 356 and past the same, the toothed gear portion 332 is disengaged from the transmission gear 400 and the first arm 510 then urges the sixth engaging portion 356 in the clockwise direction in the drawing.

Figure 15:
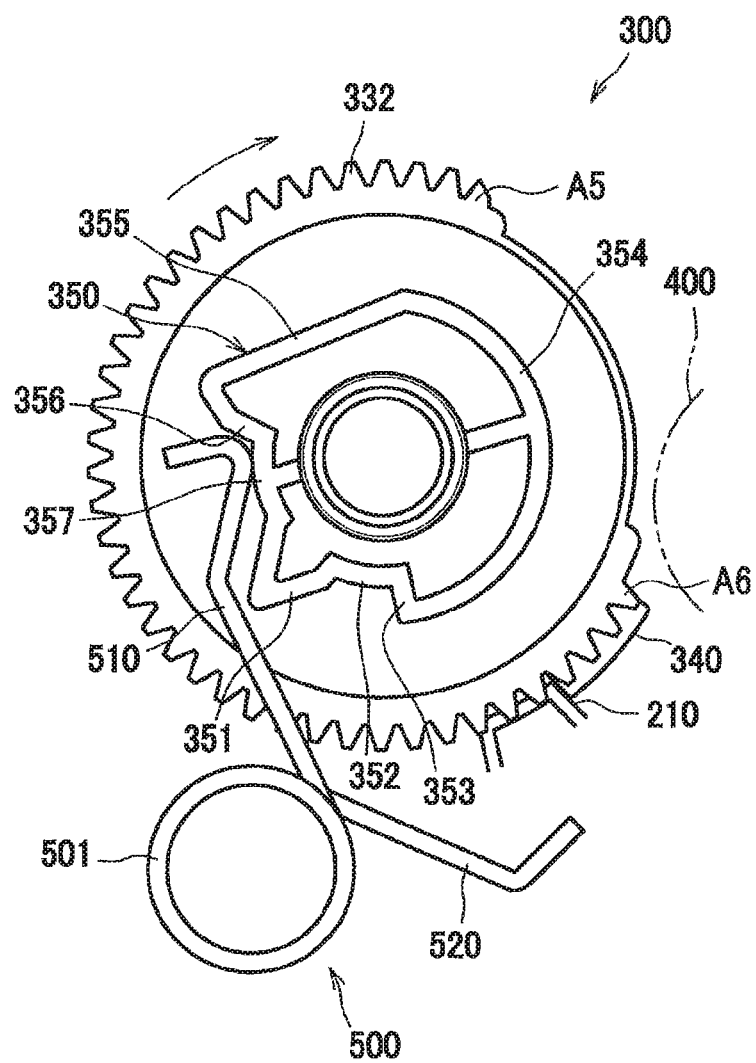
FIG. 15 is a view illustrating the relationship between the torsion spring and the spring engagement part of the detection gear at its second position in the developing cartridge (standard-type) according to the embodiment.

The detection gear 300 is thus rotated by the urging force of the torsion spring 500. When the projection 340 comes in contact with the restricting portion 210 as illustrated in FIG. 15, the rotation of the detection gear 300 is halted and the detection gear 300 is located at the second position. At the second position, the first arm 510 of the torsion spring 500 is disposed upstream of the sixth engaging portion 356 in the rotation direction and the restricting portion 210 is disposed downstream of the projection 340 in the rotation direction. Accordingly, the detection gear 300 is no longer allowed to rotate upstream or downstream in the rotation direction and is thus maintained at the second position.

Figure 16:
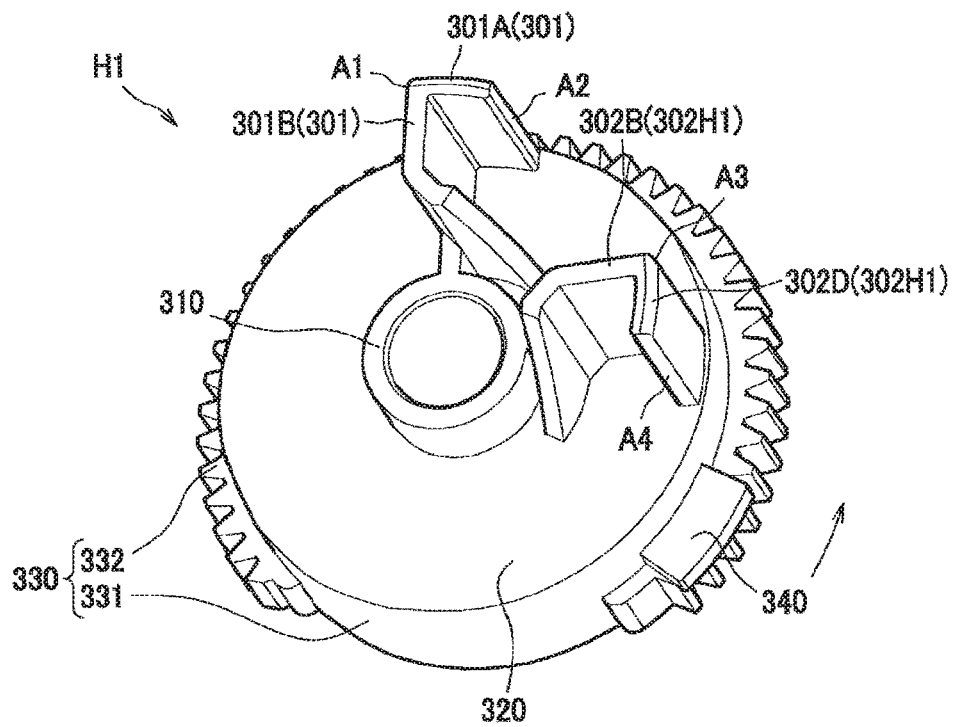
FIG. 16 is a perspective view of a detection gear provided at a developing cartridge (first high-capacity-type) according to the embodiment.

FIG. 16 illustrates a detection gear H1 which is used for the developer cartridge 8 of a first high-capacity-type which can accommodate a first amount of developer that is larger than the amount of developer that the depicted standard-type developer cartridge 8 can accommodate therein. The detection gear H1 or other types of detection gears H2 and H3 (see FIGS. 17 and 18), which will be described later, respectively have generally the same structures as that of the depicted standard-type detection gear 300. Accordingly, the same reference numerals will be used for the substantially same configurations as those of the standard type, and descriptions therefor will be omitted. In the other high-capacity-types of the developer cartridges 8 other than the standard type, the detection gear 300 of the standard type is replaced with the detection gears H1, H2 and H3, respectively.

Hereinafter, the structures of the detection gears H1, H2 and H3 will be described.

Figure 19A:
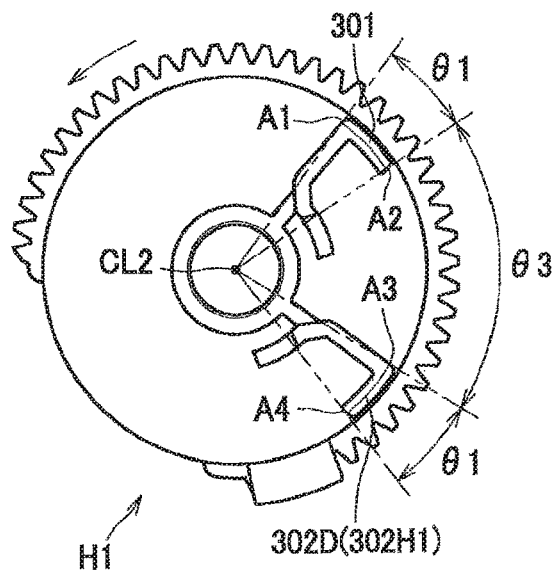
FIG. 19A is a side view of the detection gear of the developing cartridge (first high-capacity-type) according to the embodiment.

Referring to FIG. 16, the detection gear H1 integrally includes: the first protrusion 301, the shaft portion 310, the disc-shaped portion 320, the toothless gear portion 330, the projection 340 and the spring engaging portion 350 (not shown in FIG. 16) that are generally the same structure as those of the detection gear 300 of the standard type; and a second protrusion 302H1 that is different from the second protrusion 302 of the standard-type detection gear 300. The second protrusion 302H1 includes the first extension wall 302B, and an outer circumferential wall 302D. The first extension wall 302B has substantially the same configuration as the first extension wall 302B of the standard type. The outer circumferential wall 302D has a length in the rotation direction that is smaller than that of the outer circumferential wall 302A of the standard-type detection gear 300. That is, in the detection gear H1, the outer circumferential wall 302D has the third end A3 and the fourth end A4 opposite each other in the rotation direction. More specifically, as illustrated in FIG. 19A, an angle about the second axis CL2 between the second end A2 of the first protrusion 301 and the third end A3 of the second protrusion 302H1 is defined as the third angle θ3, as in the standard-type detection gear 300. An angle θ1 about the second axis CL2 between the third end A3 of the second protrusion 302H1 and the fourth end A4 of the second protrusion 302H1 is set to be the same as the first angle θ1.

By configuring the detection gear H1 as above, the detection period for the first time and the non-detection period for the first time both can be made the same as the first period T1, as in the standard type detection gear 300. Further, the detection period for the second time can be set to the first period T1 which is shorter than the detection time for the second time in the standard-type detection gear 300 (second period T2), as illustrated in FIG. 20. Accordingly, the controller determines that the mounted developer cartridge is the first high-capacity-type developer cartridge 8 when the detection period for the second time is detected to be the first period T1.

Figure 17:
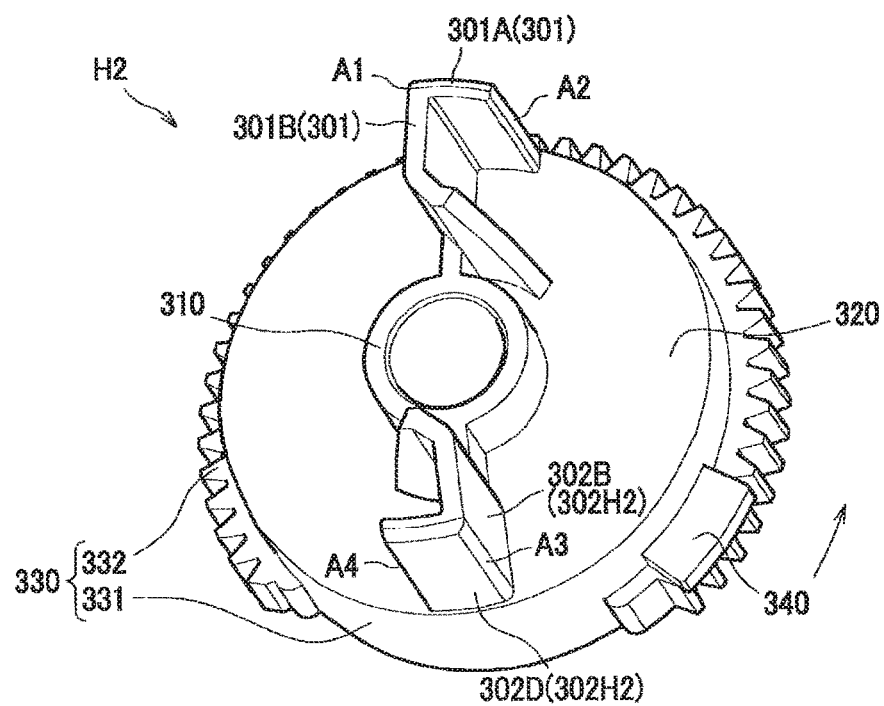
FIG. 17 is a perspective view of a detection gear provided at a developing cartridge (second high-capacity-type) according to the embodiment.

FIG. 17 illustrates the detection gear H2 which is used for the developer cartridge 8 of a second high-capacity-type that can accommodate a second amount of developer that is larger than the first amount of developer that the first high-capacity-type developer cartridge 8 can store therein. The detection gear H2 has substantially the same configuration as the detection gear H1 for the first high-capacity-type. However, the detection gear H2 includes a second protrusion 302H2 that is different from the second protrusion 302H1 of the detection gear H1. Specifically, a gap between the second end A2 of the first protrusion 301 and the third end A3 of the second protrusion 302H2 in detection gear H2 is larger than the gap between the second end A2 of the first protrusion 301 and the third end A3 of the second protrusion 302H1 in the detection gear H1.

Figure 19B:
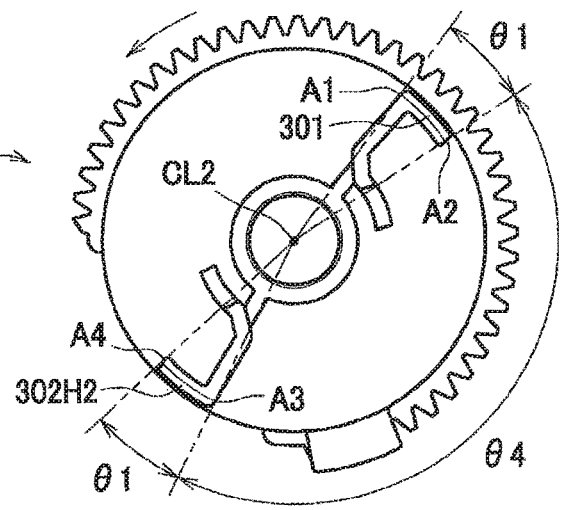
FIG. 19B is a side view of the detection gear of the developing cartridge (second high-capacity-type) according to the embodiment.

Specifically, as illustrated in FIG. 19B, an angle θ4 about the second axis CL2 between the second end A2 of the first protrusion 301 and the third end A3 of the second protrusion 302H2 is set to 149° in the embodiment.

By configuring the detection gear H2 as above, as illustrated in FIG. 20, the detection periods for the first time and the second time can be made identical to the first period T1, as in the standard-type detection gear 300; and the non-detection period for the first time can be set to a third period T3 which is longer than the first period T1. Accordingly, the controller determines that the mounted developer cartridge is the second high-capacity-type developer cartridge 8, when the non-detection period for the first time is determined to be the third period T3.

Figure 18:
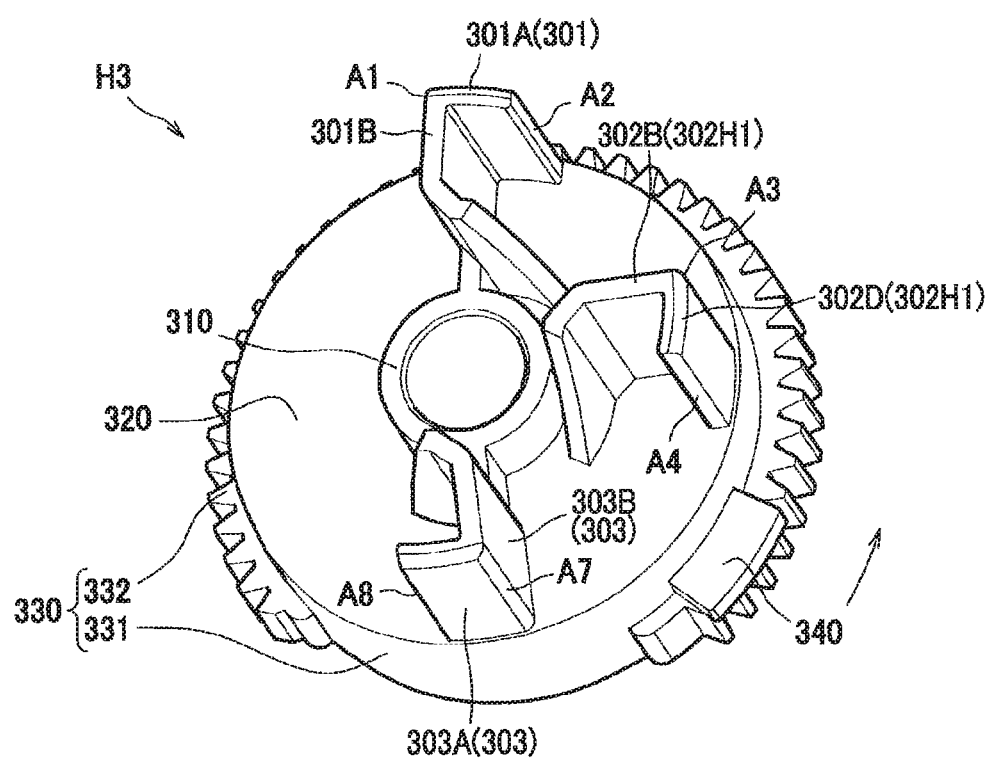
FIG. 18 is a perspective view of a detection gear provided at a developing cartridge (third high-capacity-type) according to the embodiment.

FIG. 18 illustrates the detection gear H3 which is used for the developer cartridge 8 of a third high-capacity-type that can accommodate a third amount of developer that is larger than the second amount of developer for the second high-capacity-type developer cartridge 8. The detection gear H3 includes a third protrusion 303, in addition to the structure the same as that of the detection gear H1.

The third protrusion 303 is arranged upstream of the second protrusion 302H1 in the rotation direction. In other words, the second protrusion 302H1 is disposed between the first protrusion 301 and the third protrusion 303.

The third protrusion 303 includes an outer circumferential wall 303A and an extension wall 303B. The outer circumferential wall 303A protrudes in the axial direction from the disc-shaped portion 320 and has substantially the same configuration as the arcuate wall 301A of the first protrusion 301. The extension wall 303B has substantially the same configuration as the extension wall 301B of the first protrusion 301. The outer circumferential wall 303A has a seventh end A7 constitutes a downstream end in the rotation direction and an eighth end A8 which constitutes an upstream end in the rotation direction. The eighth end A8 is located opposite the seventh end A7, and is separated farther away from the second protrusion 302H1 than the seventh end A7 is from the second protrusion 302H1.

Figure 19C:
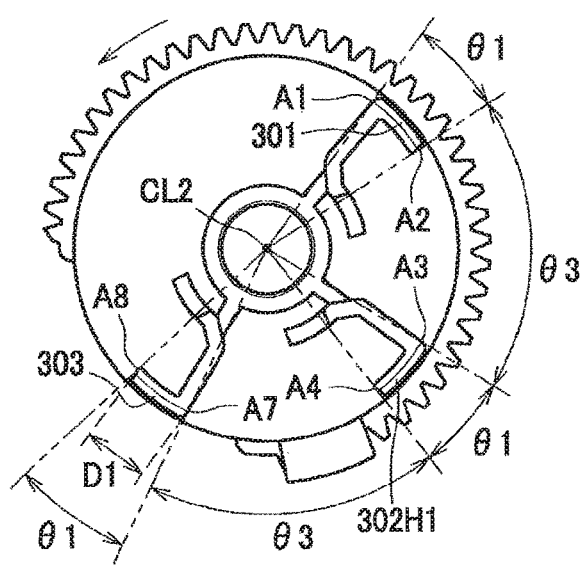
FIG. 19C is a side view of the detection gear of the developing cartridge (third high-capacity-type) according to the embodiment.

As illustrated in FIG. 19C, an angle about the second axis CL2 between the seventh end A7 of the third protrusion 303 and the eighth end A8 of the third protrusion 303 is set to be equal to the first angle θ1 about the second axis CL2 between the first end A1 of the first protrusion 301 and the second end A2 of the first protrusion 301.

As illustrated in FIG. 19C, an angle about the second axis CL2 between the fourth end A4 of the second protrusion 302H1 and the seventh end A7 of the third protrusion 303 is set to be the same as the third angle θ3 about the second axis CL2 between the second end A2 of the first protrusion 301 and the third end A3 of the second protrusion 302H1. A distance from the seventh end A7 to the eighth end A8 is set to be the same as the distance D1 that is the distance from the first end A1 to the second end A2, more specifically, within a range from 3.0 mm to 6.0 mm.

By configuring the detection gear H3 as above, the optical sensor can be made ON three times while the detection gear H3 rotates from the first position to the second position, as illustrated in FIG. 20. Accordingly, the controller determines that the mounted developer cartridge is the third high-capacity-type developer cartridge 8 when the optical sensor is rendered ON three times. In the third high-capacity-type developer cartridge 8, the detection periods from the first to third times and the non-detection periods for the first and second times are respectively set to be the first period T1 as in the standard-type detection gear 300.

According to the above-mentioned configurations, the following operational and technical advantages can be achieved.

By so configuring the first angle θ1 which is an angle about the second axis CL2 between the first end A1 and the second end A2 to be within a range from 15° to 21°, the period of time in which the lever 10 is supported by the first protrusion 301 can be extended, which can make the detection period longer if compared to a conventional art. By setting the third angle θ3 which is an angle about the second axis CL2 between the second end A2 and the third end A3 to be within a range from 62° to 69°, the period of time in which the lever 10 is located between the first protrusion 301 and the second protrusion 302 can be made longer, and the non-detection period can also be set to longer than ever, just like the detection period.

Various variations and modifications are conceivable.

The shape of the detection gear 300 is not limited to the above-mentioned embodiment and may be appropriately modified into various shapes. Here, for example, assume a configuration that: a developer cartridge 8M according to a modification to the embodiment may be supported by a drawer such that the developer cartridge 8M is pivotable about the axis of the developing roller 81; and the developer cartridge 8M may be configured to be in a first posture during a printing operation and then pivot into a second posture from the first posture when the developer cartridge 8M is detached from the drawer. In this case, when the developer cartridge 8M is pivoted from the first posture corresponding to FIG. 13A to the second posture corresponding to in FIG. 21, for example, the second protrusion 302 of the detection gear 300 may be located to overlap with the distal end portion 14 of the lever 10 when viewed in a detachment direction of the developer cartridge 8M. In this case, when the developer cartridge 8M is detached from the drawer in the detachment direction, the second protrusion 302 may get stuck with the distal end portion 14 of the lever 10, making the detachment of the developer cartridge 8M difficult. This problem occurs not only in the standard type detection gear 300, but also in the other types of detection gears H2 and H3 in which another protrusion (second protrusion 302H2 and third protrusion 303) is positioned opposite to the first protrusion 301 with respect to the second axis CL2.

Figure 22A:
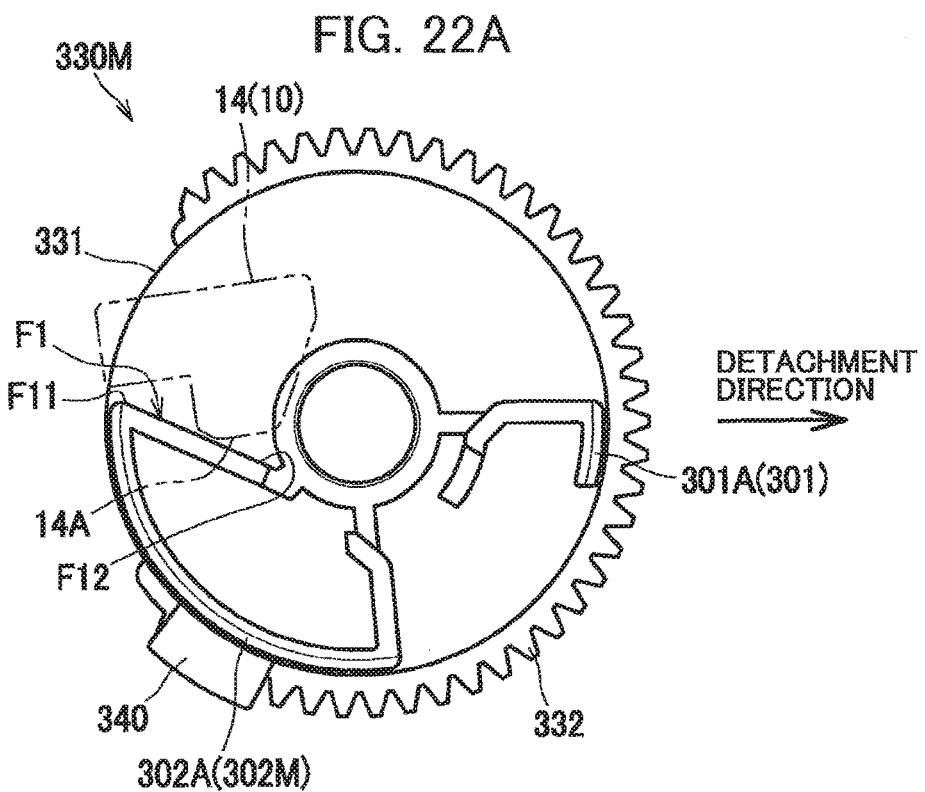
FIG. 22A is a side view of a detection gear in a developing cartridge (standard-type) according to a modification to the embodiment.
Figure 22B:
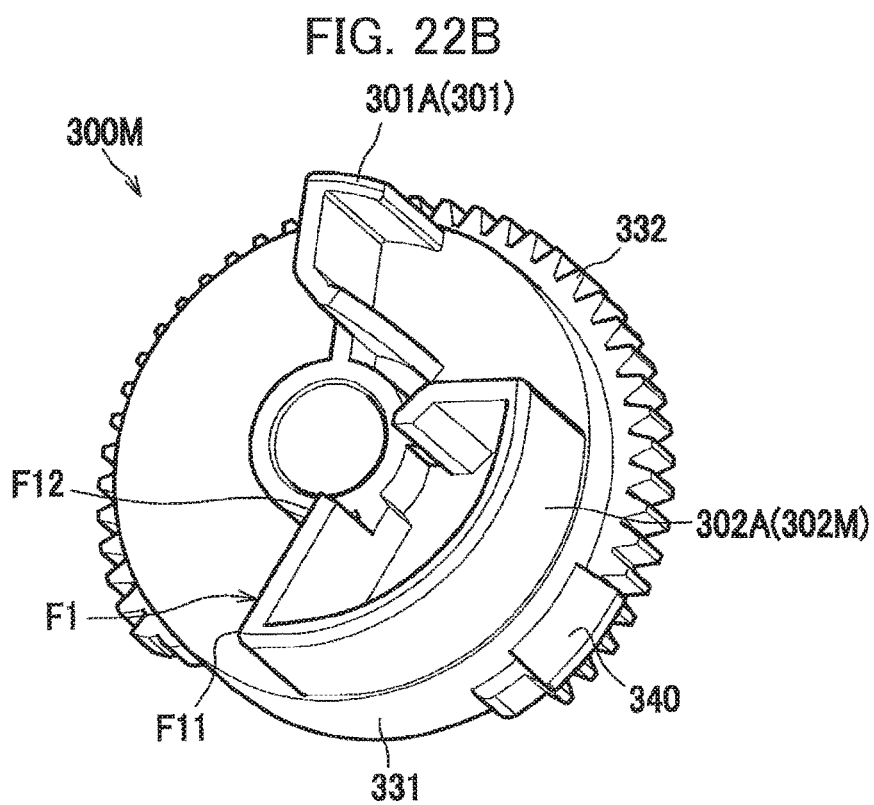
FIG. 22B is a perspective view of the detection gear in the developing cartridge (standard-type) according to the modification.

In order to solve this problem, the detection gears 300, H2, and H3 may be formed in shapes as shown in as illustrated in FIGS. 22A through 24B, for example. Specifically, FIGS. 22A and 22B show a standard-type detection gear 300M according to the modification provided in the developer cartridge 8M. This detection gear 300M includes a second protrusion 302M that has a cam surface F1 for pushing and lifting the distal end portion 14 of the lever 10 up to the position corresponding to the detection position (i.e., in a direction intersecting the detachment direction) at the time of detachment of the developer cartridge 8. In the second posture of the developer cartridge 8M (shown in FIG. 22A), the cam surface F1 and the distal end portion 14 are arranged such that: an upstream end F11 of the cam surface F1 in the detaching direction is disposed closer to the position corresponding to the detection position than a tip face 14A of the distal end portion 14 is; and the upstream end F11 is positioned upstream relative to the tip face 14A in the detachment direction.

The cam surface F1 is inclined with respect to the detachment direction when the developer cartridge 8 is in the second posture (shown in FIG. 22A). Specifically, when the developer cartridge 8 is in the second posture, the cam surface F1 obliquely extends, from the upstream end F11, in a prescribed direction from the position downstream in the detachment direction and corresponding to the detection position toward the position corresponding to the non-detection position, to a position where a downstream end F12 of the cam surface F1 is disposed downstream relative to the tip face 14A of the lever 14 in the prescribed direction from the position corresponding to the detection position to the position corresponding to the non-detection position.

Figure 23A:
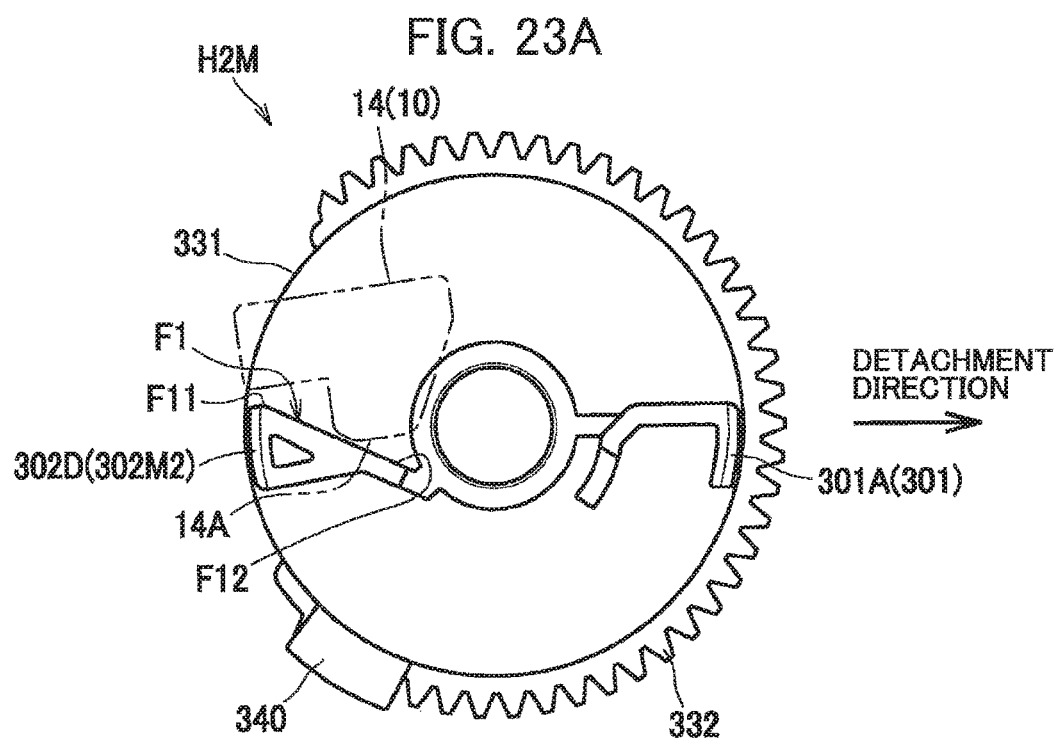
FIG. 23A is a side view of a detection gear in a developing cartridge (second high-capacity-type) according to the modification.
Figure 23B:
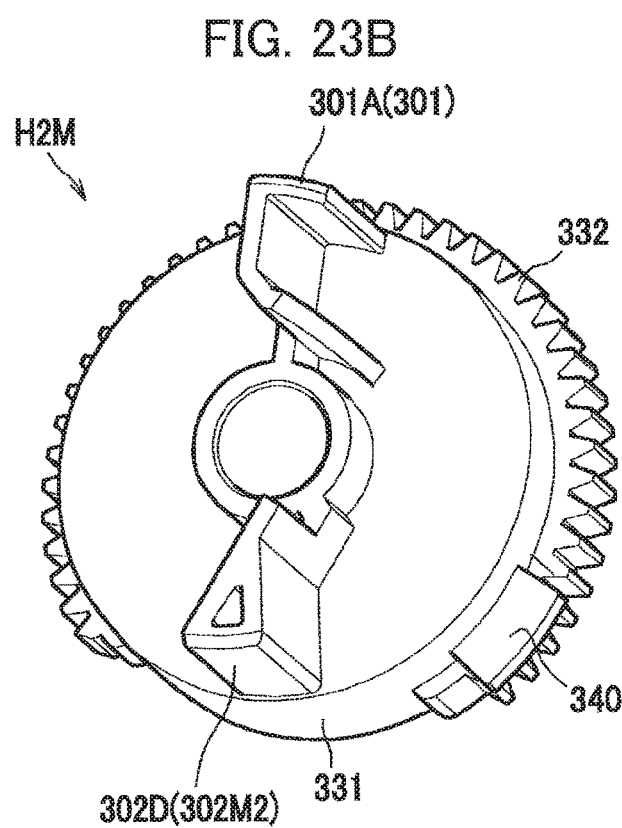
FIG. 23B is a perspective view of the detection gear in the developing cartridge (second high-capacity-type) according to the modification.

FIGS. 23A and 23B show a second high-capacity-type detection gear H2M according to the modification. The second high-capacity-type detection gear H2M may also be provided in the developer cartridge 8M. The second high-capacity-type detection gear H2M includes a second protrusion 302M2 provided with the cam surface F1 that is substantially the same as the cam surface F1 in the standard-type detection gear 300M. Specifically, in the cam surface F1, an upstream end F11 thereof in the detachment direction is disposed at a position closer to the position corresponding to the detection position than the tip face 14A of the distal end portion 14 of the lever 10 and upstream of the same in the detachment direction, when the developer cartridge 8 is in the second posture.

The cam surface F1 is inclined with respect to the detachment direction when the developer cartridge 8 is in the second posture. Specifically, when the developer cartridge 8 is in the second posture, the cam surface F1 obliquely extends, from the upstream end F11, in the prescribed direction (from the position downstream in the detachment direction and corresponding to the detection position toward the position corresponding to the non-detection position) to the position where the downstream end F12 is disposed downstream relative to the tip face 14A of the distal end portion 14 in the prescribed direction.

Figure 24A:
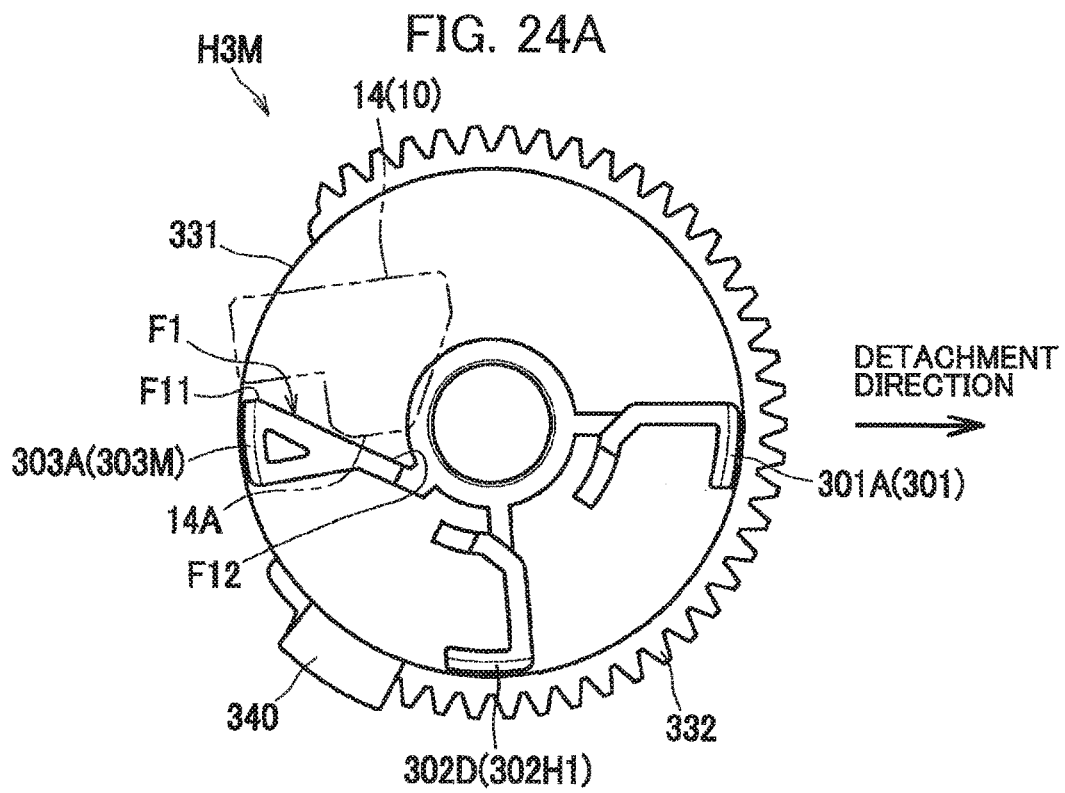
FIG. 24A is a side view of a detection gear in a developing cartridge (third high-capacity-type) according to the modification.
Figure 24B:
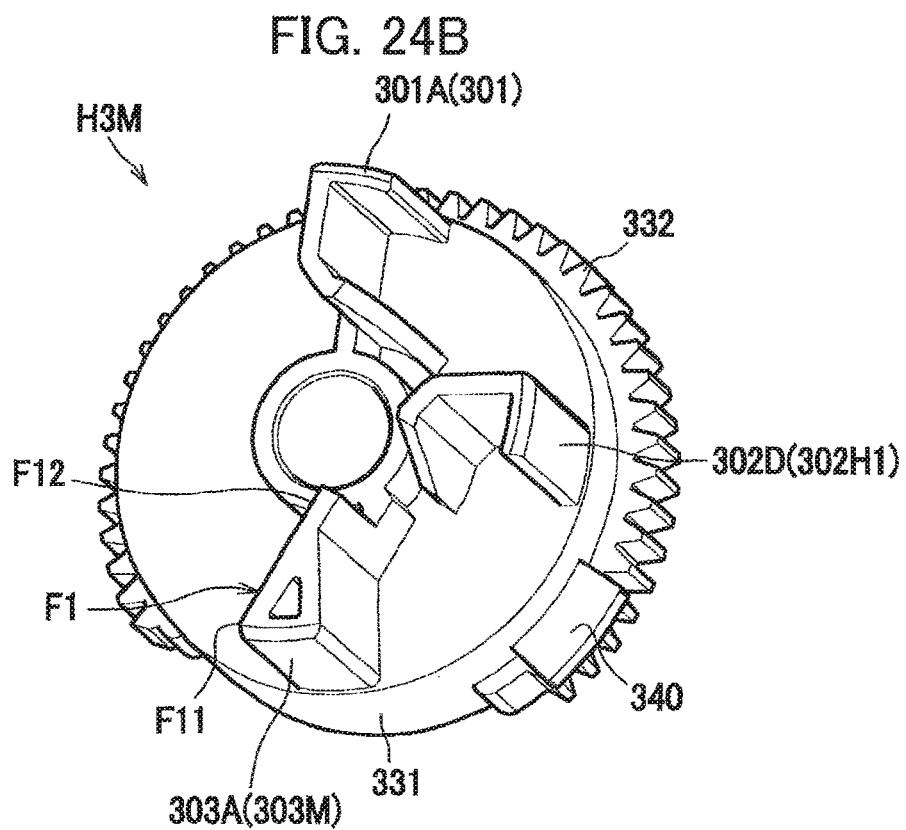
FIG. 24B is a perspective view of the detection gear in the developing cartridge (third high-capacity-type) according to the modification.

FIGS. 24A and 24B show a third protrusion 303M of a third high-capacity-type detection gear H3M according to the modification that may also be provided in the developer cartridge 8M. The third protrusion 303M is provided with the cam surface F1 which is substantially the same as the cam surface F1 in the standard type detection gear 300M. Specifically, in the cam surface F1, the upstream end F11 in the detachment direction is disposed closer to the position corresponding to the detection position than the tip face 14A of the distal end portion 14 of the lever 10 is, and upstream relative to the tip face 14A in the detachment direction, when the developer cartridge 8 is in the second posture.

The cam surface F1 is inclined with respect to the detachment direction when the developer cartridge 8 is in the second posture. Specifically, when the developer cartridge 8 is in the second posture, the cam surface F1 obliquely extends, from the upstream end F11, in the prescribed direction from the position downstream in the detachment direction and corresponding to the detection position toward the position corresponding to the non-detection position, to the position where the downstream end F12 is disposed downstream relative to the tip face 14A in the prescribed direction.

By configuring the detection gears 300M, H2M, and H3M as described above, the following operational and technical advantages can be achieved. Note that, in the following description, the third high-capacity-type detection gear H3M will be used as a representative example to describe the operational technical advantages according to the modification.

Figure 25:
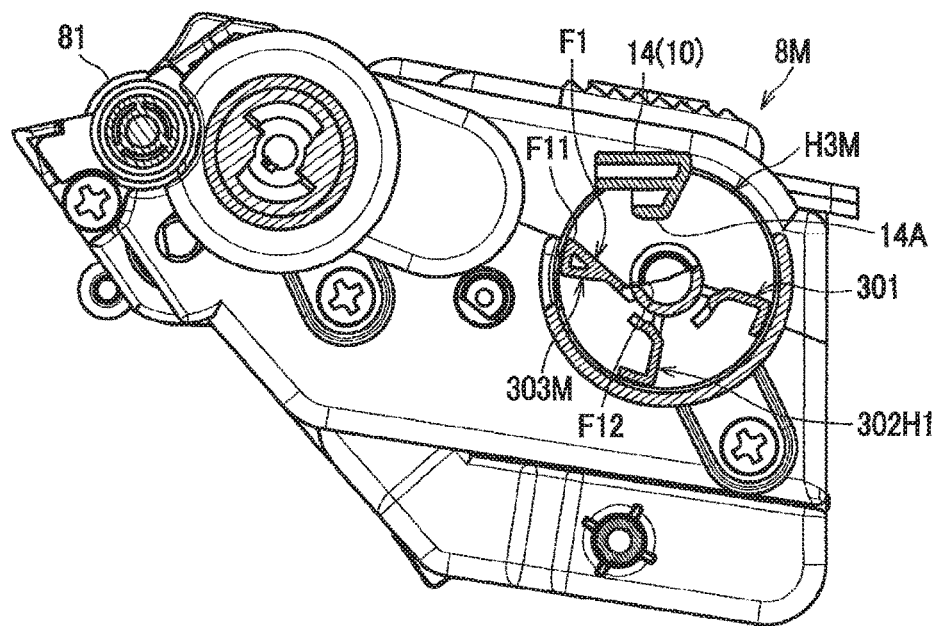
FIG. 25 is a side view explaining a relationship between the lever and the developing cartridge (third high-capacity-type) according to the modification in its first posture.
Figure 26:
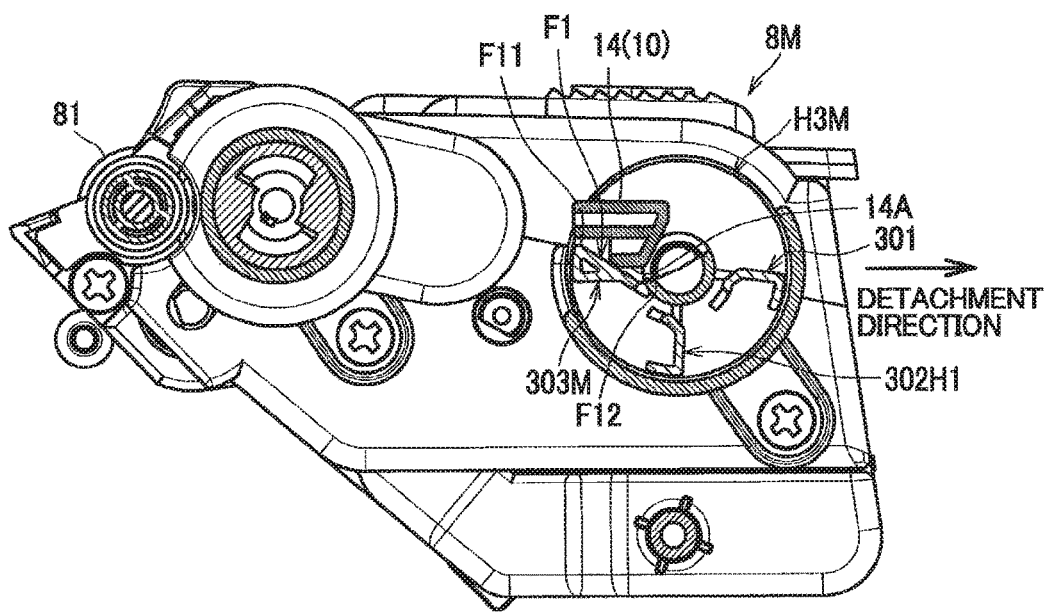
FIG. 26 is a side view explaining a relationship between the lever and the developing cartridge (third high-capacity-type) according to the modification in its second posture.
Figure 27:
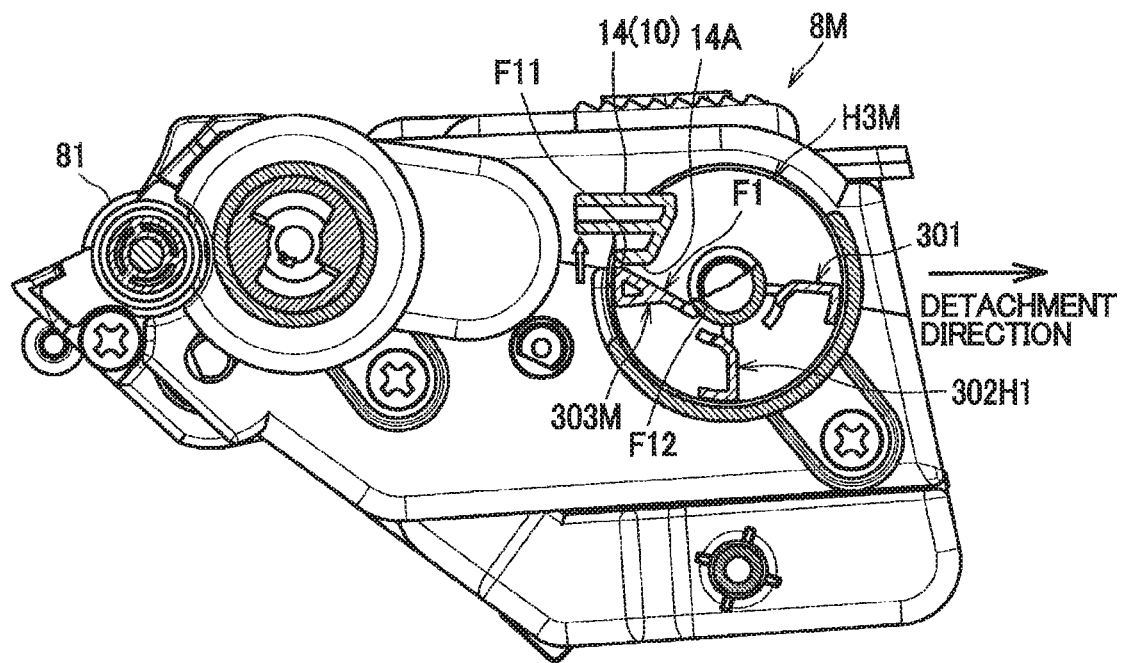
FIG. 27 is a side view illustrating how the developing cartridge (third high-capacity-type) according to the modification in its second posture is detached from the drawer.

When the developer cartridge 8M is pivoted from the first posture illustrated in FIG. 25 to the second posture illustrated in FIG. 26, the upstream end F11 of the cam surface F1 in the third protrusion 303M comes to a location upstream relative to the distal end portion 14 of the lever 10 in the detachment direction. When the developer cartridge 8M is detached from the second posture in the detachment direction indicated by an arrow show in FIG. 26, the distal end portion 14 of the lever 10 is moved along the cam surface F1 while being pushed up by the same up to the position corresponding to the detection position, as illustrated in FIG. 27. The developer cartridge 8H can be detached with ease.

As a further variation, instead of the toothed gear portion 332 of the depicted embodiment, a frictional member may be employed as the engagement portion, for example. This frictional member may be configured to frictionally engage with the transmission gear 400. For example, rubber can be used as the frictional member.

Further, while the torsion spring 500 is used as the spring in the above-mentioned embodiment, the present disclosure is not limited to this configuration. For example, a coil spring, a leaf spring, or a resin having resiliency may be used as the spring.

Further, the laser printer 1 is exemplified as the image-forming apparatus according to the present disclosure in the depicted embodiment, but the disclosure may be applied to other image-forming apparatuses, such as a copying machine and a multifunction device.

In the above-mentioned embodiment, the disclosure is applied to the developer cartridge 8 including the developing roller 81 and the developer container 84. However, the disclosure is not limited to this example. For example, if a developing device including a developing roller and a developer cartridge including a developer container are configured as separate components, the disclosure may be applied to the developer cartridge.

In the above-mentioned embodiment, the protrusions 301, 302, 303 are formed integrally with the detection gears 300, H1, H2 and H3. However, the disclosure is not limited to this configuration. For example, the protrusions may be separately provided from the detection gears, and may be formed of, for example, a resin film or a plate-like rubber material.

In the above-mentioned embodiment, the shaft portion 310 is hollow, but the shaft portion may be formed to be solid, instead.

The detection gear 300 (H1, H2, H3) is configured to engage with the transmission gear 400 supported by the agitator 85 in the embodiment, but the detection gear 300 (H1, H2, H3) may be configured to engage with the idle gear 140 rather than the transmission gear 400.

While the disclosure is described in detail with reference to the specific embodiments thereof while referring to accompanying drawings, it would be apparent to those skilled in the art that many modifications and variations may be made therein without departing from the scope of the disclosure.

What is claimed is:

1. A developer cartridge comprising:
a first gear configured to rotate about a first axis extending in an axial direction, the first gear including gear teeth; and
a second gear configured to rotate in a rotation direction about a second axis extending in the axial direction, the second gear having a peripheral surface extending in the rotation direction, the second gear comprising:
an engagement portion formed on a part of the peripheral surface and extending in the rotation direction, the engagement portion being configured to engage the gear teeth;
a first protrusion protruding in the axial direction and extending in the rotation direction, the first protrusion having a first end and a second end opposite to each other in the rotation direction; and
a second protrusion protruding in the axial direction and extending in the rotation direction, the first protrusion and the second protrusion being configured to move together with the engagement portion, the first protrusion and the second protrusion being arranged to be spaced apart from each other in the rotation direction, the second end being arranged closer to the second protrusion than the first end is to the second protrusion, the second protrusion having a third end and a fourth end opposite to each other in the rotation direction, the fourth end being arranged farther away from the first protrusion than the third end is from the first protrusion, the first end and the second end defining a first angle therebetween about the second axis, the second end and the third end defining a second angle therebetween about the second axis, the first angle being smaller than the second angle.

2. The developer cartridge as claimed in claim 1, wherein the first angle is not less than 15° but not more than 21°, and wherein the second angle is not less than 62° but not more than 69°.

3. The developer cartridge as claimed in claim 1, wherein the third end and the fourth end define a third angle therebetween about the second axis, the third angle being larger than the second angle.

4. The developer cartridge as claimed in claim 3, wherein a sum of the first angle, the second angle and the third angle is larger than 180°.

5. The developer cartridge as claimed in claim 1, further comprising:
a casing configured to accommodate developer therein; and
an agitator configured to agitate the developer within the casing, the first gear being supported by the agitator.

6. The developer cartridge as claimed in claim 5, wherein the second gear further comprises a disc-shaped portion centered on the second axis, the disc-shaped portion having an opposing surface opposing the casing and another surface opposite the opposing surface, the disc-shaped portion having a peripheral surface connecting the opposing surface and the another surface, the first protrusion and the second protrusion protruding from the another surface, the engagement portion being provided along the peripheral surface of the disc-shaped portion.

7. The developer cartridge as claimed in claim 6, further comprising a spring in contact with the second gear,
wherein the second gear further comprises a spring engaging portion protruding from the opposing surface of the disc-shaped portion toward the casing, the spring engaging portion being in engagement with the spring, the spring engaging portion having a length in the axial direction that is larger than a length of the engagement portion in the axial direction.

8. The developer cartridge as claimed in claim 6, wherein the engagement portion has a fifth end and a sixth end opposite each other in the rotation direction, the fifth end being engageable with the gear teeth of the first gear, a direction from the fifth end toward the sixth end along the engagement portion being defined as a first direction, the fifth end and the second end defining a length therebetween in the first direction that is shorter than a length defined between the fifth end and the third end in the first direction.

9. The developer cartridge as claimed in claim 8, wherein the second gear is configured to move from a first position to a second position, the fifth end of the engagement portion being in contact with the gear teeth of the first gear when the second gear is at the first position, the sixth end of the engagement portion contacting the gear teeth while the second gear moving from the first position toward the second position, the gear teeth defining a rotational locus in accordance with rotation of the first gear, the sixth end of the engagement portion being located outside the rotational locus of the gear teeth when the second gear is at the second position.

10. The developer cartridge as claimed in claim 9, further comprising a gear cover configured to cover the first gear and a part of the second gear,
wherein the second gear further comprises a projection protruding radially outward from the peripheral surface of the disc-shaped portion, the projection being configured to contact the gear cover when the second gear is at the second position, the projection and the casing defining a distance therebetween in the axial direction that is larger than a distance defined between the engagement portion and the casing in the axial direction.

11. The developer cartridge as claimed in claim 1, wherein the second protrusion has a length in the rotation direction that is larger than a length of the first protrusion in the rotation direction.

12. The developer cartridge as claimed in claim 1, wherein the second gear comprises a third protrusion protruding in the axial direction and extending in the rotation direction, the second protrusion being arranged between the first protrusion and the third protrusion, the third protrusion having a seventh end and an eighth end opposite to each other in the rotation direction, the eighth end being arranged farther away from the second protrusion than the seventh end is from the second protrusion, the fourth end and the seventh end defining an angle therebetween that is not less than 62° but not more than 69° about the second axis, the seventh end and the eighth end defining an angle therebetween that is not less than 15° but not more than 21° about the second axis.

13. The developer cartridge as claimed in claim 12, wherein the seventh end and the eighth end define a distance therebetween that is not less than 3.0 mm but not more than 6.0 mm.

14. The developer cartridge as claimed in claim 13, wherein the distance defined between the seventh end and the eighth end is not less than 3.8 mm but not more than 4.5 mm.

15. The developer cartridge as claimed in claim 1, wherein the engagement portion comprises gear teeth.

16. The developer cartridge as claimed in claim 1, wherein the engagement portion comprises a friction member.

17. The developer cartridge as claimed in claim 16, wherein the friction member is rubber.

18. The developer cartridge as claimed in claim 1, wherein the first end and the second end define a distance therebetween that is not less than 3.0 mm but not more than 6.0 mm.

19. The developer cartridge as claimed in claim 18, wherein the distance defined between the first end and the second end is not less than 3.8 mm but not more than 4.5 mm.

20. The developer cartridge as claimed in claim 1, wherein the angle defined between the first end and the second end about the second axis is not less than 17° but not more than 20°, the angle defined between the second end and the third end about the second axis being not less than 63° but not more than 66°.

21. The developer cartridge as claimed in claim 1, further comprising a rotatable developing roller extending in the axial direction.

* * * * *